US012573414B2

(12) United States Patent
Xiao et al.

(10) Patent No.: US 12,573,414 B2
(45) Date of Patent: Mar. 10, 2026

(54) SPEECH SIGNAL ENCODING AND DECODING METHODS AND APPARATUSES, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Wei Xiao, Shenzhen (CN); Qingbo Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1003 days.

(21) Appl. No.: 17/679,456

(22) Filed: Feb. 24, 2022

(65) Prior Publication Data

US 2022/0180881 A1     Jun. 9, 2022

Related U.S. Application Data

(63) Continuation of application No. PCT/CN2021/071237, filed on Jan. 12, 2021.

(30) Foreign Application Priority Data

Mar. 11, 2020     (CN) .......................... 202010167199.2

(51) Int. Cl.
*G10L 19/02*          (2013.01)
*G06N 3/044*          (2023.01)
            (Continued)

(52) U.S. Cl.
CPC ........ *G10L 19/0208* (2013.01); *G06N 3/0442* (2023.01); *G06N 3/045* (2023.01);
            (Continued)

(58) Field of Classification Search
None
See application file for complete search history.

(56) References Cited

U.S. PATENT DOCUMENTS

RE46,082 E     *   7/2016   Kim ...................... G10L 19/028
10,249,313 B2 *   4/2019   Gao ........................ G10L 19/12
            (Continued)

FOREIGN PATENT DOCUMENTS

CN          101276587 A      10/2008
CN          101325059 A      12/2008
            (Continued)

OTHER PUBLICATIONS

Kehuang Li, Chin-Hui Lee; A Deep Neural Network Approach To Speech Bandwidth Expansion : URL: https://ieeexplore.ieee.org/stamp/stamp.jsp?tp=&arnumber=7178801 (Year: 2015).*
            (Continued)

*Primary Examiner* — Richa Sonifrank
(74) *Attorney, Agent, or Firm* — Sughrue Mion, PLLC

(57)          ABSTRACT

Embodiments of the disclosure provide a speech signal encoding and decoding methods and apparatuses, an electronic device, and a computer-readable storage medium. The decoding method includes: obtaining a bitstream including a first substream, and the first substream being a bitstream obtained by encoding a low-frequency subband signal of an original speech signal by using a first encoding method; and performing signal reconstruction based on the first substream in a case that the bitstream includes no second substream, to obtain a reconstructed speech signal; or performing signal reconstruction based on the first substream and at least one second substream in a case that the bitstream includes the at least one second substream, to obtain a reconstructed speech signal, each second sub stream being obtained by encoding a high-frequency subband signal of the original speech signal, and the encoding being performed by using a second encoding method corresponding to the each second substream.

19 Claims, 6 Drawing Sheets

(51) Int. Cl.

| | |
|---|---|
| *G06N 3/0442* | (2023.01) |
| *G06N 3/045* | (2023.01) |
| *G06N 3/09* | (2023.01) |
| *G10L 19/00* | (2013.01) |
| *G10L 19/002* | (2013.01) |
| *G10L 19/008* | (2013.01) |
| *G10L 19/032* | (2013.01) |
| *G10L 19/06* | (2013.01) |
| *G10L 19/16* | (2013.01) |
| *G10L 19/26* | (2013.01) |
| *G10L 21/038* | (2013.01) |
| *G10L 25/18* | (2013.01) |
| *G10L 25/30* | (2013.01) |

(52) U.S. Cl.

CPC ................ *G06N 3/09* (2023.01); *G10L 19/00*
(2013.01); *G10L 19/008* (2013.01); *G10L*
*19/06* (2013.01); *G10L 21/038* (2013.01);
*G10L 25/18* (2013.01); *G10L 25/30* (2013.01);
*G06N 3/044* (2023.01); *G10L 19/002*
(2013.01); *G10L 19/02* (2013.01); *G10L*
*19/0204* (2013.01); *G10L 19/032* (2013.01);
*G10L 19/16* (2013.01); *G10L 19/26* (2013.01)

(56) References Cited

U.S. PATENT DOCUMENTS

| | | | | | |
|---|---|---|---|---|---|
| 11,631,418 | B2 * | 4/2023 | Nagel | .................. | G10L 19/265 |
| | | | | | 704/500 |
| 11,854,571 | B2 * | 12/2023 | Wen | ......................... | G06N 3/09 |
| 2010/0114581 | A1 * | 5/2010 | Li | .......................... | G10L 19/24 |
| | | | | | 704/500 |

| | | | | | |
|---|---|---|---|---|---|
| 2014/0074489 | A1 * | 3/2014 | Chong | .................... | G10L 19/04 |
| | | | | | 704/500 |
| 2016/0365098 | A1 * | 12/2016 | Tsujino | .................. | G10L 19/24 |
| 2017/0221498 | A1 * | 8/2017 | Gao | ...................... | G10L 21/038 |
| 2017/0256267 | A1 * | 9/2017 | Disch | ..................... | G10L 19/06 |
| 2018/0040336 | A1 * | 2/2018 | Wu | ......................... | G10L 19/26 |
| 2018/0182400 | A1 * | 6/2018 | Choo | .................... | G10L 21/038 |
| 2018/0279050 | A1 * | 9/2018 | Ryu | ....................... | H04W 4/80 |
| 2019/0156843 | A1 * | 5/2019 | Multrus | ............... | G10L 19/265 |
| 2019/0304478 | A1 | 10/2019 | Welvaadt | | |
| 2020/0176004 | A1 * | 6/2020 | Kleijn | .................... | G10L 19/00 |
| 2022/0180881 | A1 * | 6/2022 | Xiao | ....................... | G10L 25/30 |
| 2022/0217467 | A1 * | 7/2022 | Ishizuka | ............. | H04R 29/008 |
| 2025/0027846 | A1 * | 1/2025 | Green | ................... | G01H 1/003 |
| 2025/0069608 | A1 * | 2/2025 | Grill | ..................... | G10L 19/173 |

FOREIGN PATENT DOCUMENTS

| | | | | | |
|---|---|---|---|---|---|
| CN | 101572087 | A | 11/2009 | | |
| CN | 101751926 | A | 6/2010 | | |
| CN | 103280222 | A | 9/2013 | | |
| CN | 107705801 | A | * 2/2018 | .......... | G10L 21/038 |
| CN | 107993672 | A | * 5/2018 | ......... | G10L 21/0388 |

OTHER PUBLICATIONS

Translation of the Written Opinion issued Apr. 12, 2021 in International Application No. PCT/CN2021/071237.

Office Action issued May 30, 2024 in Chinese Application No. 202010167199.2.

Written Opinion for PCT/CN2021/071237, dated Apr. 12, 2021.

International Search Report for PCT/CN2021/071237, dated Apr. 12, 2021.

\* cited by examiner

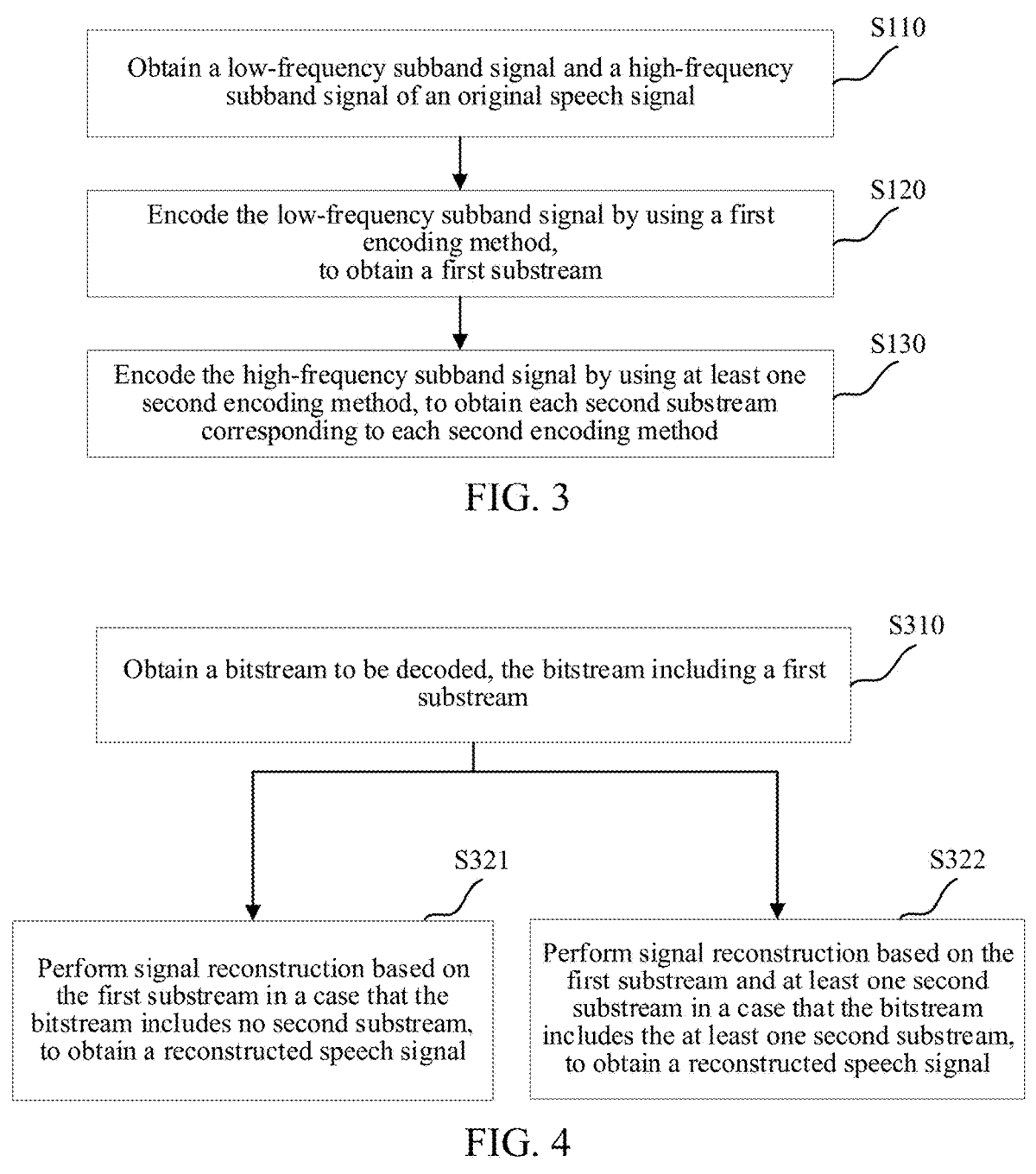

S110

Obtain a low-frequency subband signal and a high-frequency subband signal of an original speech signal

S120

Encode the low-frequency subband signal by using a first encoding method,
to obtain a first substream

S130

Encode the high-frequency subband signal by using at least one second encoding method, to obtain each second substream corresponding to each second encoding method

Obtain a bitstream to be decoded, the bitstream including a first substream

S321

Perform signal reconstruction based on the first substream in a case that the bitstream includes no second substream, to obtain a reconstructed speech signal

S322

Perform signal reconstruction based on the first substream and at least one second substream in a case that the bitstream includes the at least one second substream, to obtain a reconstructed speech signal

FIG. 4

SPEECH SIGNAL ENCODING AND DECODING METHODS AND APPARATUSES, ELECTRONIC DEVICE, AND STORAGE MEDIUM

CROSS-REFERENCE TO RELATED APPLICATION(S)

This application is a continuation application of International Application No. PCT/CN2021/071237, filed Jan. 12, 2021, which claims priority to Chinese Patent Application No. 202010167199.2, filed on Mar. 11, 2020 with the China National Intellectual Property Administration, the disclosures of which are incorporated by reference in their entireties.

FIELD

The disclosure relates to signal processing technologies, and embodiments of the disclosure relate to speech signal encoding and decoding methods and apparatuses, an electronic device, and a computer-readable storage medium.

BACKGROUND

Speech encoding aims to digitize speech and reduce an encoding rate by utilizing redundancy existing during human vocalization and features of human hearing. In a communication system, speech encoding is extremely important, because to a large extent, speech encoding determines quality of received speech and a system capacity.

OPUS encoding is a widely used encoding technology. Compared with common encoding methods such as Moving Picture Experts Group Audio Layer III (MP3) and Advanced Audio Coding (AAC), OPUS encoding is more efficient, suitable for network audio transmission fields such as Voice over Internet Protocol (VoIP).

The applicant of the disclosure found in the specific implementation process that: when a bitstream using the OPUS encoding method is transmitted, once a packet loss occurs, a speech signal cannot be recovered on a receiver side.

SUMMARY

The objective of embodiments of the disclosure is to provide a speech signal encoding and decoding methods and apparatuses, an electronic device, and a computer-readable storage medium. Based on the solution, a problem that no speech signal can be obtained through reconstruction on a decoder side may be effectively avoided, and a high-quality speech signal may be obtained through reconstruction while a bitstream corresponding to a high-frequency part may be obtained. The solution provided in the embodiments of the disclosure is as follows:

An aspect of an example embodiment of the disclosure provides a speech signal decoding method, the method including:

obtaining a bitstream to be decoded, the bitstream comprising a first substream, and the first substream being a bitstream obtained by encoding a low-frequency subband signal of an original speech signal by using a first encoding method; and obtaining a reconstructed speech signal by: performing first signal reconstruction based on the first substream based on the bitstream including no second substream; or performing second signal reconstruction based on the first substream and at least one second substream based on the bitstream including the at least one second substream, each second substream being obtained by encoding a high-frequency subband signal of the original speech signal, and the encoding of the high-frequency subband being performed by using a second encoding method corresponding to the each second substream.

An aspect of an example embodiment of the disclosure provides a speech signal encoding method, performed by at least one processor, the method including:

obtaining a low-frequency subband signal and a high-frequency subband signal of an original speech signal;

encoding the low-frequency subband signal by using a first encoding method, to obtain a first substream; and encoding the high-frequency subband signal by using at least one second encoding method, to obtain each second sub stream corresponding to each second encoding method.

An aspect of an example embodiment of the disclosure provides a speech signal decoding apparatus, including:

at least one memory configured to store program code; and at least one processor configured to read the program code and operate as instructed by the program code, the program code including:

bitstream obtaining code configured to cause the at least one processor to obtain a bitstream to be decoded, the bitstream comprising a first substream, and the first substream being a bitstream obtained by encoding a low-frequency subband signal of an original speech signal by using a first encoding method;

and signal reconstruction code configured to cause the at least one processor to obtain a reconstructed speech signal by performing: (i) first signal reconstruction based on the first substream based on the bitstream comprising no second substream or (ii) second signal reconstruction based on the first substream and at least one second substream based on the bitstream comprising the at least one second substream, each second sub stream being obtained by encoding a high-frequency subband signal of the original speech signal, and the encoding of the high-frequency subband signal being performed by using a second encoding method corresponding to the each second sub stream.

An aspect of an example embodiment of the disclosure provides an electronic device, including a memory and a processor; the memory storing a computer program; and the processor being configured to perform the speech signal encoding method or the speech signal decoding method provided in the embodiments of the disclosure during execution of the computer program.

An aspect of an example embodiment of the disclosure provides a non-transitory computer-readable storage medium, storing a computer program, the computer program, when executed by a processor, performing the speech signal encoding method or the speech signal decoding method provided in the embodiments of the disclosure.

BRIEF DESCRIPTION OF THE DRAWINGS

To describe the technical solutions in the embodiments of the disclosure more clearly, the following briefly describes the accompanying drawings required for describing the embodiments of the disclosure.

FIG. 3 is a schematic flowchart of a speech signal encoding method according to an embodiment of the disclosure.

FIG. 4 is a schematic flowchart of a speech signal decoding method according to an embodiment of the disclosure.

DETAILED DESCRIPTION

Figure 1:
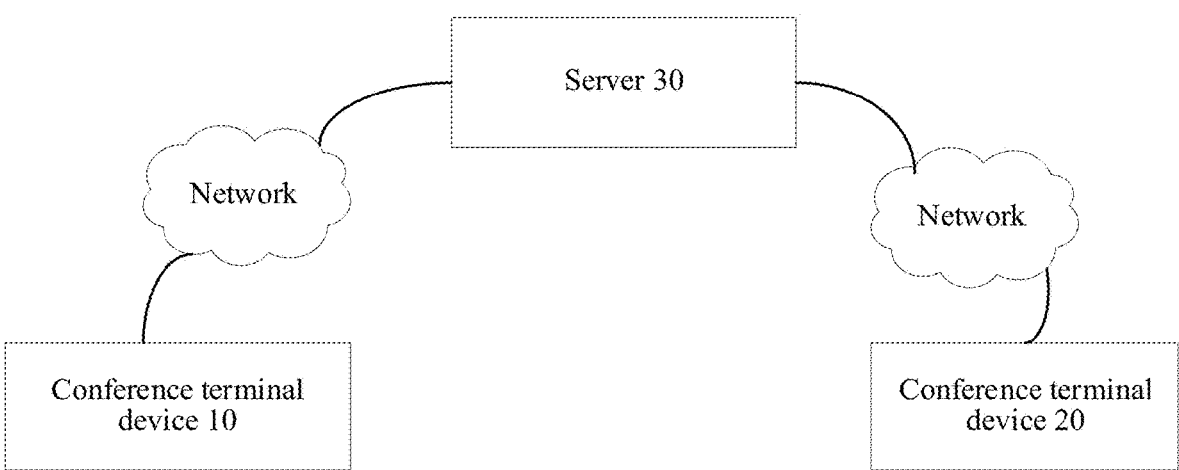
FIG. 1 is a schematic structural diagram of a voice conference system according to an embodiment of the disclosure.

The following describes example embodiments of the disclosure in detail. Examples of the embodiments are shown in the accompanying drawings, and same or similar reference signs in all the accompanying drawings indicate same or similar components or components having same or similar functions. The embodiments that are described below with reference to the accompany drawings are exemplary, and are only used to interpret the disclosure and cannot be construed as a limitation to the disclosure.

A person skilled in the art would understand that, the singular forms "a", "an", "said", and "the" used herein may include the plural forms as well, unless the context clearly indicates otherwise. It is to be further understood that, the terms "include" and/or "comprise" used in this specification of the embodiments of the disclosure refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to the another element, or an intermediate element may exist. In addition, the "connection" or "coupling" used herein may include a wireless connection or a wireless coupling. The term "and/or" used herein includes all of or any of units and all combinations of one or more related listed items.

In order to help better understanding of the solutions provided in the example embodiments of the disclosure, the following first describes the technical terms and related technologies involved in the disclosure.

At present, the commonly used speech signal encoding methods include a parameter encoding method based on speech parameters of a speech signal, and a method of directly encoding a speech signal.

For the parameter encoding method, one way is to encode a set of parameters used for describing the speech signal, such as linear prediction (OPUS-LP) encoding. This encoding method is to estimate a time-domain waveform based on linear prediction and excitation models. An error of prediction is controlled by analysis. The encoding parameters include a signal type, a linear predictive coding (LPC) parameter quantization value, a long term prediction (LTP) parameter quantization value, an excitation signal (including symbols), and the like. These parameters are scalar or vector quantized by looking up a table. Subsequently, index values in the corresponding table are encoded and transmitted. After receiving the foregoing index values, a decoder side parses and looks up the table to recover the foregoing parameters and performs synthetic filtering based on the foregoing parameters.

Another parameter encoding method is an encoding method based on bandwidth expansion (BWE), audio bandwidth extension, and other technologies. This method may generate a high-frequency spectrum by additional means on the basis of reconstructing a low-frequency spectrum during decoding, so as to improve quality of a decoded signal. For the BWE technology, side information for describing a correlation between a low-frequency spectrum and a high-frequency spectrum is encoded and transmitted. After obtaining the foregoing side information, a receiver side may generate a high-frequency spectrum by using a signal processing technology. For the audio bandwidth extension technology, a high-frequency spectrum may be predicted on the basis of a low-frequency spectrum through deep learning on the receiver side without additional side information. The encoding efficiency of BWE is very high, and no bits are required for the audio bandwidth extension.

The method of directly encoding a speech signal is to obtain a frequency domain coefficient by performing time-frequency transform on the speech signal. The time-frequency transform includes a short-time Fourier transform (SFTF), a modified discrete cosine transform (MDCT), and the like. After the frequency domain coefficient is obtained, the frequency domain coefficient may be divided into several subbands (quantities of coefficients of the subbands may be the same or different), and a spectral envelope of each subband is calculated based on the each subband. If BWE is implemented based on the frequency domain, the spectral envelope calculated by a BWE process may be reused. For each subband, an original spectrum is normalized by using the spectral envelope, and then encoded by vector quantization or scalar quantization. A transmission side encodes and transmits the foregoing quantized value. After obtaining the foregoing information, the receiver side may reconstruct the spectrum, and perform inverse time-frequency transform to obtain a time-domain signal. Compared with the BWE technology, if there are enough bits, accuracy of reconstruction using transform-domain encoding is higher.

OPUS is an encoding technology the most widely used in the VoIP field, and is divided into two sub-encoders: (1) An LP mode is based on a classic speech encoding technology and may encode a signal with a sampling rate of up to 16 kHz. (2) CELT is a transform-domain encoding method, transforming a signal into the MDCT domain and encodes the signal through vector quantization. In addition, in combination of the LP mode and CELT, an ultra-wideband and full-band speech encoding effect may be achieved.

Although there are various types of speech encoding methods in the related art, in a speech signal encoding, decoding, and outgoing process, due to impact of various original factors such as quantization distortion (QD), transcoding distortion (TD), and transmission network quality, quality of a signal that may be obtained through decoding by a signal receiver side still needs to be improved. During the use of the OPUS encoding method, because the OPUS does not have scalability, once a packet loss occurs during transmission, the speech signal cannot be recovered on the receiver side.

In view of the foregoing problems existing in the related art, the embodiments of the disclosure provide speech signal encoding and decoding methods and apparatuses, a device, and a computer-readable storage medium. Based on the solution provided in the embodiments of the disclosure, the probability of recovering a speech signal on a receiver side may be effectively improved, and a high-quality speech signal may be recovered when network transmission quality is good.

The speech signal encoding and decoding methods provided in the embodiments of the disclosure may be independently implemented by a terminal device/server; or may be implemented collaboratively by a terminal device and a server. For example, after acquiring an original speech signal, the terminal device independently performs the speech signal encoding method described below to perform encoding, to obtain a corresponding bitstream (a bitstream to be decoded), and stores the bitstream. When the original speech signal needs to be played, the bitstream to be decoded is decoded by using the speech signal decoding method described below, and the decoded speech signal is played. After acquiring an original speech signal, a terminal device A performs the speech signal encoding method described below on the original speech signal, performs encoding to obtain a corresponding bitstream (a bitstream to be decoded), and sends the bitstream to be decoded to the server. The server decodes the bitstream to be decoded, and sends the decoded speech signal to a terminal device B for playback.

The electronic device provided in the embodiments of the disclosure for implementing the video encoding method and the video decoding method described below may be various types of terminal devices or servers. The server may be an independent physical server, or may be a server cluster or a distributed system including a plurality of physical servers, or may be a cloud server that provides cloud computing services. The terminal device may be a smartphone, a tablet computer, a notebook computer, a desktop computer, a smart speaker, a smart watch, or the like, and is not limited thereto. The terminal device and the server may be directly or indirectly connected in a wired or wireless communication manner. This is not limited in an example embodiment of the disclosure.

In order to better illustrate the method provided in the embodiments of the disclosure, the method is further described below with reference to an example of an application scenario.

FIG. 1 is a schematic structural diagram of a remote teleconferencing system in this example. As shown in FIG. 1, the remote teleconferencing system may include a conference terminal device 10 and a conference terminal device 20. The conference terminal device 10 and the conference terminal device 20 are communicatively connected to a server 30. As shown in FIG. 1, the conference terminal device 10 and the conference terminal device 20 are each communicatively connected to the server 30 through a network. The conference terminal device 10 and the conference terminal device 20 each may be specifically a mobile phone, a computer, another dedicated conference call apparatus, and the like. It would be understood that, during actual application, two or more parties may participate in a conference call.

The encoding method and the decoding method provided in the embodiments of the disclosure are described below in actual applications with reference to specific application scenarios based on the remote teleconferencing system shown in FIG. 1.

During initiation of a conference, the conference terminal device 10 and the conference terminal device 20 communicate with each other through the server 30. For example, the conference terminal device 10 and the conference terminal device 20 are each a smartphone. A conference participant A from one party participating in the conference (the party corresponding to the device 10) initiates a communication request through a smartphone to a smartphone of a conference participant B from the other party (the party corresponding to the device 20). After the conference participant B accepts the request, communication is established between the two parties of the conference.

During successful communication establishment for a voice conference, a voice session of one or more conference participants from one party participating in the conference may be acquired by an audio acquisition module (such as a microphone) of the conference terminal device 10 and speech encoded. For example, after a speech signal is acquired by the microphone, the speech signal may be divided into frames. In this case, each speech frame may be encoded by using the encoding method provided in the embodiments of the disclosure, and a bitstream obtained through encoding is sent to the conference terminal device 20 through the server 30. For the received bitstream, the conference terminal device 20 may implement, by using the corresponding decoding method provided in the embodiments of the disclosure, reconstruction of the speech signal based on a specific case of each bitstream included in the received bitstream, and play the reconstructed speech signal to a conference participant of the other party participating in the conference through an audio playback device (such as a speaker).

Similarly, the speech of the conference participant of the other party participating in the conference may also be acquired and speech encoded by an audio acquisition module of the conference terminal device 20, and is then sent to the conference terminal device 10 through the server 30. The conference terminal device 20 reconstructs and plays the speech signal based on a specific case of the bitstream included in the received bitstream.

In some embodiments, the foregoing speech signal encoding and decoding methods may be further applied to, but not limited to, teleconferencing and live video streaming scenarios.

The terminal device may include, but is not limited to, various applications, for example, an on-line education application, an instant messaging application, a community space application, a game application, a shopping application, a browser application, a financial application, a multimedia application, and a live streaming application.

Based on the solution provided in an example embodiment of the disclosure, the receiver side of the speech signal may obtain a speech signal with acceptable quality (or sufficiently high quality) through reconstruction provided that the receiver side may receive a substream corresponding to a low-frequency subband signal, and may obtain a reconstructed signal with high quality when further receiving a substream corresponding to a high-frequency subband signal. Therefore, the solution provided in an example embodiment of the disclosure may effectively avoid a problem that a speech signal cannot be recovered on a decoder side once a packet loss occurs, and a speech signal with high quality may be recovered when a network state is favorable, thereby effectively ensuring auditory perception of conference participants.

During implementation of the solution provided in an example embodiment of the disclosure, some operations may include an operation of obtaining a low-frequency subband signal and a high-frequency subband signal of an original speech signal and an operation of reconstructing a speech signal based on the low-frequency subband signal and the high-frequency subband signal obtained from a decoding result. For example, the two operations may be implemented by using a QMF analysis-synthesis filter bank. For ease of description and understanding of an example embodiment of the disclosure, the following first briefly describes the principle of the QMF analysis-synthesis filter bank.

Figure 2:
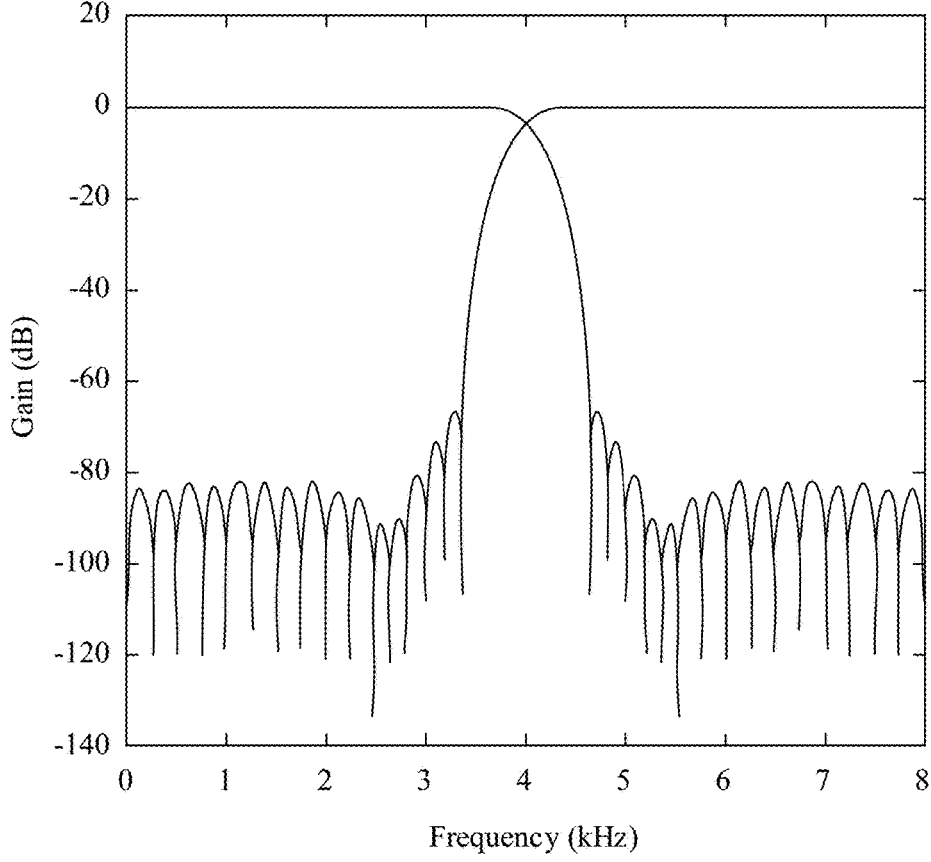
FIG. 2 is a schematic diagram of a spectral response curve of a quadrature mirror filter (QMF).

According to a classical signal theory, each frequency includes amplitude and phase information, and the QMF is a filter pair including analysis-synthesis. A QMF analysis filter may decompose an inputted signal with a sampling rate of Fs into two signals each with a sampling rate of Fs/2, respectively representing a QMF low-pass signal and a QMF high-frequency signal. FIG. 2 is a schematic diagram of a spectral response curve of a quadrature mirror filter (QMF). FIG. 2 shows a spectral response curve of a low-pass part $H_{Low}(z)$ and a high-pass part $H_{High}(z)$ of a QMF filter. A horizontal coordinate represents a frequency in kHz, and a longitudinal coordinate represents an amplitude gain in dB. A correlation between coefficients of low-pass filtering and high-pass filtering of the QMF filter may be expressed as:

$$h_{High}(k) = -1^k h_{Low}(k)$$

where k is an order of the QMF filter, $h_{High}(k)$ is a high-pass filter coefficient of a $k^{th}$-order filter, and $h_{Low}(k)$ is a low-pass filter coefficient of the $k^{th}$-order filter.

Similarly, according to a QMF related theory, a QMF synthesis filter bank (a low-pass filter $G_{Low}(z)$ and a high-pass filter $G_{High}(z)$) may be described based on a QMF analysis filter bank ($H_{Low}(z)$ and $H_{High}(z)$):

$$G_{Low}(z) = H_{Low}(z)$$

$$G_{High}(z) = (-1)^* H_{High}(z)$$

A low-pass signal and a high-pass signal recovered from the decoder side are processed by the QMF synthesis filter bank, and then the signal with the sampling rate of Fs may be recovered.

In order to make the objective, technical solutions, and advantages of the embodiments of the disclosure clearer, how the implementations of the embodiments of the disclosure and the technical solutions of the embodiments of the disclosure resolve the foregoing technical problems is described in detail below with reference to specific embodiments and the accompanying drawings. The following example embodiments may be combined with each other, and the same or similar concepts or processes may not be described repeatedly in some embodiments. The following describes the embodiments of the disclosure with reference to the accompanying drawings.

FIG. 3 is a schematic flowchart of a speech signal encoding method according to an embodiment of the disclosure. As shown in FIG. 3, the method may mainly include the following operations S110, S120, and S130:

Operation S110: Obtain a low-frequency subband signal and a high-frequency subband signal of an original speech signal.

The original speech signal is a speech signal to be encoded. A source of the speech signal is not limited in an example embodiment of the disclosure. For example, the speech signal may be a speech signal acquired from a user, a received speech signal, or an audio signal in a video. For example, in an application scenario of speech signal transmission (such as a voice call, an audio conference, or an audio and video conference), an example original speech signal is a speech signal to be transmitted.

The low-frequency subband signal is a low-frequency part of the original speech signal. The high-frequency subband signal is a high-frequency part of the original speech signal.

For example, the low-frequency subband signal may be obtained by using a low-pass filter, and the high-frequency subband signal may be obtained by using a high-pass filter. For ease of description, in the following description of the embodiments of the disclosure, the low-frequency subband signal may alternatively be referred to as a low-pass signal, a low-pass subband signal, a low-frequency signal, or a low-frequency part, and the high-frequency subband signal may alternatively be referred to as a high-pass signal, a high-pass subband signal, a high-frequency signal, or a high-frequency part.

In some embodiments, the obtaining a low-frequency subband signal and a high-frequency subband signal of an original speech signal includes: processing the original speech signal by using a QMF analysis filter, to obtain the low-frequency subband signal and the high-frequency subband signal of the original speech signal.

For example, assuming that a sampling rate of an original speech signal s(n) is Fs, after the speech signal goes through the QMF analysis filter and downsampling by 2, two subband signals, namely, a low-pass subband signal s_LB(n) and a high-pass subband signal s_HB(n) may be obtained, and the two subband signals each have a sampling rate of Fs/2.

Operation S120: Encode the low-frequency subband signal by using a first encoding method, to obtain a first substream.

Operation S130: Encode the high-frequency subband signal by using at least one second encoding method, to obtain each second substream corresponding to each second encoding method.

Specific encoding methods of the first encoding method and the second encoding method are not limited in an example embodiment of the disclosure, and may be configured according to actual requirements in an embodiment. For example, the first encoding method may be a time domain encoding method, such as an OPUS-LP encoding method, and the second encoding method may be one or two of an encoding method based on BWE or a transform domain encoding method.

Operation S120 and operation S130 may be performed in a sequential order, or may not be performed in a sequential order. For example, if a processing result of operation S120 or intermediate data in the processing process needs to be used during implementation of the used second encoding method, operation S130 is performed after operation S120; if the implementation of the used second encoding method is irrelevant to operation S120, operation S120 and operation S130 may not be performed in a sequential order.

In some embodiments, encoding of the first substream mainly relates to the low-frequency signal, and the second substream mainly relates to the high-frequency signal.

Therefore, during transmission of the original speech signal, a transmission priority of the first substream is higher than that of the each second substream.

Similarly, in a case that at least two second encoding methods are used, transmission priorities of the second substreams respectively may be different.

Because a low-frequency signal part is a core part of the original speech signal, encoding quality of the first sub stream corresponding to the low-frequency subband signal is higher than encoding quality of the each second sub stream corresponding to the high-frequency subband signal. During bitstream transmission, in order to better ensure that the high-quality first substream is received by a receiver side, the transmission priority of the first substream is higher than the transmission priority of the each second substream. Similarly, in order to implement scalable encoding methods with multiple levels, when multiple second substreams are obtained by using multiple second encoding methods, encoding quality and transmission priorities of the second sub streams may also be different, so as to adapt to various different application scenarios and transmission networks in various states.

In the solution provided in an example embodiment of the disclosure, an original speech signal may be encoded by using two or more encoding methods, a low-frequency subband signal may be encoded by using a first encoding method, and a high-frequency subband signal may be encoded by using one or more (including two) second encoding methods, to obtain bitstreams corresponding to various different encoding methods. With this solution, the speech signal may be encoded at multiple levels, and during transmission of an encoded bitstream, a speech signal with acceptable quality may be recovered provided that a first substream corresponding to the low-frequency subband signal may be received. Further, if a second substream may be received, a speech signal with better quality may be recovered based on the first substream and the second substream. Therefore, with the solution provided in an example embodiment of the disclosure, a possibility of recovering a speech signal on a receiver side may be effectively increased, and a high-quality speech signal may be recovered when network transmission quality is good (e.g., a network transmission quality parameter(s) satisfying a certain condition(s)), thereby better meeting various application scenarios of speech signal transmission.

In some embodiments, the second encoding method may include an encoding method based on BWE. In this case, the encoding the high-frequency subband signal by using the encoding method based on BWE includes: obtaining spectral envelope information of the high-frequency subband signal; and performing quantization encoding based on the spectral envelope information of the high-frequency subband signal.

An encoding method based on BWE is not limiting in an example embodiment of the disclosure, and may be selected according to actual requirements.

For example, the first encoding method is a time domain encoding method, and the second encoding method includes a transform domain encoding method. In this case, the encoding the high-frequency subband signal by using the transform domain encoding method includes: encoding the high-frequency subband signal or encoding the high-frequency subband signal and a residual signal by using the transform domain encoding method, the residual signal being a residual signal between an encoding result of the low-frequency subband signal and the low-frequency subband signal.

In other words, the high-frequency subband signal and the residual signal may be encoded by using the transform domain encoding method. A specific implementation of encoding a signal by using a transform domain encoding method includes: performing a time-frequency transform on a signal to be encoded (e.g., the high-frequency subband signal in an example embodiment of the disclosure), and then encoding the signal by using the transform domain encoding method. No further details are described herein.

Corresponding to the speech signal encoding method provided in an example embodiment of the disclosure, an embodiment of the disclosure further provides a speech signal decoding method. FIG. 4 is a schematic flowchart of a speech signal decoding method according to an embodiment of the disclosure. As shown in FIG. 4, the speech signal decoding method may include the following operations S310, S321, S322:

Operation S310: Obtain a bitstream to be decoded, the bitstream including a first substream, and the first substream being a bitstream obtained by encoding a low-frequency subband signal of an original speech signal by using a first encoding method.

Operation S321: Perform signal reconstruction based on the first substream in a case that the bitstream includes no second sub stream (corresponding to a high-frequency subband signal), to obtain a reconstructed speech signal.

Operation S322: Perform signal reconstruction based on the first sub stream and at least one second substream in a case that the bitstream includes the at least one second substream, to obtain a reconstructed speech signal, each second substream being a bitstream obtained by encoding a high-frequency subband signal of the original speech signal by using a second encoding method corresponding to the each second sub stream.

Based on the decoding method of an example embodiment of the disclosure, after a bitstream to be decoded is obtained, if the bitstream includes only a first substream, reconstruction may be performed based on the substream to obtain a speech signal with acceptable quality. If the bitstream further includes a second substream, signal reconstruction may be based on the first sub stream and the second sub stream, to obtain a speech signal with high speech quality through reconstruction. Based on this solution, a possibility of obtaining a speech signal through reconstruction on a decoder side may be effectively ensured. In addition, a high-quality speech signal may be obtained through reconstruction in a case that a second substream may be obtained, thereby better meeting an actual application requirement.

In some embodiments, the performing signal reconstruction based on the first substream, to obtain a reconstructed speech signal may include: decoding the first substream to obtain a first subband signal; performing reconstruction based on the first subband signal to obtain a second subband signal corresponding to the low-frequency subband signal of the original speech signal and a third subband signal corresponding to the high-frequency subband signal; and obtaining a decoded speech signal based on the second subband signal and the third subband signal.

It would be understood that, the first subband signal is a subband signal that is obtained through decoding and that corresponds to a low-frequency part of the original speech signal.

Because the first substream is obtained through encoding by using the first encoding method, the first substream may be decoded by using a decoding method corresponding to the first encoding method, to obtain a main part (that is, the foregoing first subband signal) of a low-pass signal of the original speech signal, and a second subband signal corresponding to the low-pass signal of the original speech signal and a third subband signal corresponding to a high-pass signal of the original speech signal may be obtained through reconstruction based on this part, thereby obtaining a reconstructed speech signal based on the low-pass signal and the high-pass signal obtained through reconstruction. For different first encoding methods, methods for obtaining a speech signal through reconstruction based on the first substream may be different. For example, when the first encoding method is OPUS-LP encoding, the first substream is decoded by using an OPUS-LP decoding method.

In some embodiments, the low-frequency subband signal and the high-frequency subband signal are obtained by processing a speech signal by a QMF analysis filter. Correspondingly, the obtaining a decoded speech signal based on the second subband signal and the third subband signal includes: obtaining the decoded speech signal based on the second subband signal and the third subband signal by using a QMF synthesis filter.

During encoding of the original speech signal, band division may be performed on the speech signal by using the QMF analysis filter, to obtain the low-frequency subband signal and the high-frequency subband signal of the speech signal. In this case, after the second subband signal corresponding to the low-frequency subband signal and the third subband signal corresponding to the high-frequency subband signal are obtained through reconstruction based on the obtained bitstream, the signals may be combined by using the QMF synthesis filter to obtain the reconstructed speech signal.

After the first subband signal is obtained based on the first substream, the second subband signal and the third subband signal may be obtained by using an audio bandwidth extension method. For this solution, an example embodiment of the disclosure provides the following two implementations:

Implementation 1: determining a first spectral coefficient of the first subband signal; performing prediction based on the first spectral coefficient by using a first neural network model to obtain a second spectral coefficient; and obtaining the second subband signal and the third subband signal based on the first spectral coefficient and the second spectral coefficient.

Implementation 2: determining a first spectral coefficient of the first subband signal; obtaining a third spectral coefficient by copying the first spectral coefficient; obtaining a first specified quantity of first subband spectral envelopes based on the third spectral coefficient; performing prediction based on the first spectral coefficient by using a second neural network model to obtain the first specified quantity of second subband spectral envelopes; adjusting the third spectral coefficient based on the first subband spectral envelope and the second subband spectral envelope to obtain a fourth spectral coefficient; and obtaining the second subband signal and the third subband signal based on the first spectral coefficient and the fourth spectral coefficient.

With the advancement of deep learning, it is possible to "predict" a high-resolution image from a low-resolution image or "predict" an audio signal with a high sampling rate from an audio signal with a low sampling rate through deep learning. Therefore, even if only the first bitstream corresponding to the low-frequency subband signal is obtained, the decoder side may still obtain, through reconstruction, a signal with acceptable quality and having a sampling rate consistent with that of an inputted signal (that is, the original speech signal) on the encoder side.

In the foregoing implementation 1 and implementation 2 provided in an example embodiment of the disclosure, deep learning is used to predict a spectral coefficient or a spectral envelope by using a trained neural network model, and signal reconstruction is performed based on a prediction result and a spectral coefficient of a low-frequency part that is obtained based on the first substream, to obtain a second subband signal corresponding to the low-frequency part and a third subband signal corresponding to a high-frequency part.

As can be learned from the foregoing description, when the first encoding method is used to encode the low-frequency subband signal of the original speech signal to obtain the first substream, the first encoding method may be a time domain encoding method, such as an OPUS-LP encoding method. That the first encoding method is an OPUS-LP encoding method is used as an example for describing the solution of obtaining a speech signal through reconstruction based on the first substream.

For example, when the first substream is obtained, reconstruction of a low-pass signal may be implemented by using an OPUS-LP decoding method. Similar to G.729.1 and other classical encoders, the encoding method may obtain a signal type, an LPC parameter quantization value, an LTP parameter quantization value, and a quantization index value of a parameter such as an excitation signal by analyzing the first substream. For different variables (in scalar or vector form), specific values of the corresponding variables may be obtained through table lookup, code table indexing, and other operations. Subsequently, the low-pass signal may be obtained through reconstruction based on these specific values by calling a synthesis filtering process.

In the foregoing implementation 1, the second subband signal and the third subband signal are obtained through reconstruction in a manner based on coefficient regression. In the foregoing implementation 2, the second subband signal and the third subband signal are obtained through reconstruction in a manner based on parametric regression. For ease of description, further description is provided below with reference to a specific example.

It is assumed that the original speech signal to be encoded has a sampling rate of Fs=32000 Hz and a frame length of 20 ms. Therefore, corresponding to a low-pass signal or a high-pass signal, there are 640 sample points in each frame. For a low-pass signal or a high-pass signal with Fs=16000 Hz, a 50% overlapping MDCT may be used as an example, and after combination and window addition of two consecutive frames each of 20 ms, the MDCT is performed, and 320 MDCT coefficients may be obtained.

Generally, LP analysis may recover a spectrum related to 0-7000 Hz, corresponding to the coefficients within a range of 0-279 of low-pass MDCT coefficients (first low-pass coefficients, that is, first spectral coefficients). Therefore, in order to recover the corresponding low-pass signal and high-pass signal, only coefficients within a range of 280-319 of low-pass MDCT coefficients (second low-pass coefficients) and coefficients within a range of 0-239 of high-pass MDCT coefficients (first high-pass coefficients) need to be recovered, to obtain a spectrum related to 0-14000 Hz. It would be understood that, the second low-pass coefficients and the second high-pass coefficients are the foregoing second spectral coefficients.

For a bandwidth extension scheme of the foregoing implementation 1, MDCT coefficients corresponding to the second low-pass coefficients and the first high-pass coefficient may be predicted by establishing a 280-to-280 mapping network (that is, the foregoing first neural network model).

Specific network structures of the first neural network model and the second neural network model are not limited in an example embodiment of the disclosure, and may be configured according to actual requirements in an embodiment. For example, both models may be depth neural networks. During actual application, an initial depth neural network may be trained with collected training data by calling an open source deep learning toolkit such as TensorFlow or PyTorch, to obtain an internal parameter of the depth neural network, namely, a model parameter. After the trained depth neural network is obtained, for any inputted new data, required low-frequency and high-frequency MDCT coefficients may be predicted by calling the network parameter.

For example, the first neural network model may include an input layer, a hidden layer, and an output layer that are sequentially cascaded. The hidden layer may include a long short-term memory (LSTM) layer and a fully connected layer that are sequentially cascaded. There may be one or more LSTM layers and one or more fully connected layers. For example, there may be two cascaded LSTM layers each including 1024 node and one fully connected layer including 512 nodes.

During prediction of the second spectral coefficient through the neural network model, an input of the input layer is the first spectral coefficient, that is, a first low-pass coefficient of 280 points in the foregoing example. The LSTM layer is used for performing feature extraction on data processed by the input layer. The fully connected layer is used for performing feature extraction again on a feature vector obtained through extraction by the LSTM layer. The output layer is used for obtaining an output vector with a dimension of 280 based on the feature vector obtained through extraction by the fully connected layer. Element values of all elements in the output vector are predicted second spectral coefficients, that is, MDCT coefficients of the 280 points including the second low-pass coefficient and the first high-pass coefficient in the foregoing example.

Coefficient regression is a highly redundant deep learning method, with a complex network structure and slow model training and data processing. Therefore, for example, the more efficient manner based on parametric regression provided in the foregoing implementation 2 provided in an example embodiment of the disclosure may be used. The theoretical basis of this manner lies in that compared with a low-frequency part, a high-frequency spectrum has a high tolerance to distortion. Therefore, processing of relatively low precision may be used.

For example, for the foregoing implementation 2, N (N≥2) adjacent first spectral coefficients may be combined into one subband, where for example, N=20. For the foregoing example, 280 first low-pass coefficients may be divided into 14 subbands, to obtain 14 (a first specified quantity in this example) subband spectral envelopes (that is, the foregoing second subband spectral envelopes). In this bandwidth extension scheme, establishment of a 280-to-14 mapping network may predict subband envelope values corresponding to a high-frequency MDCT coefficient and some low-frequency MDCT coefficients. The subband envelope value may be defined as average energy of a subband coefficient, or a representation thereof in a logarithmic domain. In other words, prediction may be performed based on the 280 first low-pass coefficients by using the second neural network model to obtain the 14 subband spectral envelopes corresponding to the second low-pass coefficient and the first high-pass coefficient.

For example, the second neural network model may include an input layer, a hidden layer, and an output layer. The hidden layer may include an LSTM layer and a fully connected layer that are sequentially cascaded. For example, there may be one LSTM layer with 1024 nodes and one fully connected layer with 512 nodes. When the 14 subband spectral envelopes are obtained through prediction, an input of the input layer is 280 first low-pass coefficients. The LSTM layer performs feature extraction on a feature vector processed by the input layer. The fully connected layer processes the feature vector processed by the LSTM layer. The output layer performs prediction based on an output of the LSTM layer to obtain envelope values of the 14 subband spectral envelopes.

Compared with the bandwidth extension scheme of the implementation 1, the bandwidth extension scheme of the implementation 2 may have a simpler network structure and lower complexity.

In order to obtain 40 second low-pass coefficients and 240 first high-pass coefficients, initial second low-pass coefficients and first high-pass coefficients (that is, the foregoing third spectral coefficients) may be obtained by copying the first low-pass coefficients, for example, by copying coefficients within a range of 140-279 of the first low-pass coefficients twice. Subsequently, the same manner may be used to divide the initial second low-pass coefficients and first high-pass coefficients into 14 subband spectral envelopes (that is, the foregoing first subband spectral envelopes), and fourth spectral coefficients may be obtained from the initial second low-pass coefficients and first high-pass coefficients based on differences between the first subband spectral envelopes and the second subband spectral envelopes. The coefficients are corrected second low-pass coefficients and first high-pass coefficients. Subsequently, the second subband signal and the third subband signal may be obtained based on the first spectral coefficients and the fourth spectral coefficients.

For example, in this example, each subband spectral envelope (the first subband spectral envelope and the second subband spectral envelope) corresponds to 20 third spectral coefficients, and one difference may be determined based on each pair of first subband spectral envelope and second subband spectral envelope corresponding to each other. The difference may be used as a parameter for adjusting corresponding 20 third spectral coefficients. In this way, the initial spectral coefficient may be adjusted based on the parameter, to obtain an adjusted fourth spectral coefficient.

During actual application, in order to reduce a scale of a variable and facilitate calculation without changing the nature and correlation of data, data in the logarithmic domain is usually used for calculation. After the logarithm is taken, the data may be made more stable, and so on. Therefore, in the foregoing subband spectral envelopes in an example embodiment of the disclosure, each may be specifically an envelope value in the logarithmic domain. Correspondingly, when gain adjustment is performed on the third spectral coefficients based on the foregoing differences, the third spectral coefficients may be first transformed into coefficients in the logarithmic domain and then adjusted by using the corresponding differences. Certainly, in another manner, logarithmic transformation may alternatively not be performed on the initial spectral coefficients. Instead, inverse logarithmic transformation is performed on the foregoing differences, and the transformed differences are applied to the corresponding initial spectral coefficients, to achieve gain control of the spectral coefficients.

For example, for a first subband spectral envelope, based on the difference corresponding to the first subband spectral envelope (difference between the first subband spectral envelope and the second subband spectral envelope corresponding to the first subband spectral envelope), 20 third spectral coefficients corresponding to the first subband spectral envelope may be adjusted. For example, a logarithmic transformation may be performed on each spectral coefficient corresponding to the first subband spectral envelope, to obtain a coefficient in the logarithmic domain. Gain adjustment is performed on each coefficient in the logarithmic domain based on the difference corresponding to the first subband spectral envelope, to obtain each adjusted coefficient. Subsequently, an inverse logarithmic transformation is performed on the each adjusted coefficient, to obtain 20 fourth spectral coefficients corresponding to the first subband spectral envelope.

When at least one second bitstream corresponding to the high-frequency subband signal may be obtained, speech signal reconstruction may be implemented based on the first substream and the second substream, to obtain a speech signal with higher quality.

In some embodiments, performing signal reconstruction based on the first subband signal and the at least one second substream, to obtain a decoded speech signal includes: performing reconstruction based on the first substream and the at least one second substream to obtain a fourth subband signal corresponding to the low-frequency subband signal and a fifth subband signal corresponding to the high-frequency subband signal; and obtaining the decoded speech signal based on the fourth subband signal and the fifth subband signal.

In a case that there is one second substream, the performing reconstruction based on the first subband signal and the at least one second substream to obtain a fourth subband signal and a fifth subband signal may include: decoding the first substream, and obtaining a first spectral coefficient based on a decoding result; decoding the second substream, and obtaining a fifth spectral coefficient based on a decoding result; and obtaining the fourth subband signal and the fifth subband signal based on the first spectral coefficient and the fifth spectral coefficient.

It would be understood that, the first spectral coefficient is a spectral coefficient of the first subband signal that is obtained by decoding the first substream, that is, a spectral coefficient corresponding to the low-frequency part of the original speech signal that is obtained through decoding and analysis, and the second substream is a bitstream corresponding to the high-frequency part of the original speech signal. Therefore, a spectral coefficient corresponding to the high-frequency part may be obtained by decoding and analyzing the second substream, and then the reconstructed low-frequency subband signal and high-frequency subband signal, that is, the fourth subband signal and the fifth subband signal, may be obtained based on the spectral coefficients of the two parts.

In some embodiments, the decoding the second substream, and obtaining a fifth spectral coefficient based on a decoding result includes: decoding the second substream, and obtaining a second specified quantity of third subband spectral envelopes based on a decoding result; obtaining a sixth spectral coefficient by copying the first spectral coefficient; obtaining the second specified quantity of fourth subband spectral envelopes based on the sixth spectral coefficient; and adjusting the sixth spectral coefficient based on the fourth subband spectral envelope and the third subband spectral envelope to obtain the fifth spectral coefficient.

In this solution, the first spectral coefficient of the low-frequency part obtained through decoding may be copied as some spectral coefficients of the low-frequency part (corresponding to the foregoing second low-pass coefficient) and some initial spectral coefficients of the high-frequency part (corresponding to the foregoing first high-pass coefficient). Then, the initial spectral coefficients are adjusted based on a decoding result of the second substream, to obtain spectral coefficients that are more accurate.

For example, during actual application, during adjustment of the sixth spectral coefficient based on the fourth subband spectral envelope and the third subband spectral envelope, the sixth spectral coefficient may be adjusted based only on the fourth subband spectral envelope and the third subband spectral envelope. For example, each subband spectral envelope corresponds to a particular quantity of spectral coefficients. For example, 20 adjacent spectral coefficients are used as one subband. In this case, an envelope value of one subband spectral envelope may be obtained through calculation based on every 20 adjacent spectral coefficients. For example, the first fourth subband spectral envelope corresponds to the first 20 sixth spectral coefficients; the third subband spectral envelope also corresponds to the first 20 spectral coefficients obtained through decoding. The first 20 sixth spectral coefficients and the 20 spectral coefficients obtained through decoding all correspond to the same 20 spectral coefficients in the signal to be reconstructed. Therefore, gain adjustment may be performed on the first 20 sixth spectral coefficients based on a difference between the third spectral envelope and the fourth spectral envelope, to obtain 20 adjusted spectral coefficients (that is, fifth spectral coefficients). In this manner, gain adjustment may be performed on all sixth spectral coefficients.

In some embodiments, the adjusting the sixth spectral coefficient based on the fourth subband spectral envelope and the third subband spectral envelope to obtain the fifth spectral coefficient includes: performing prediction based on the first spectral coefficient by using a third neural network model to obtain the second specified quantity of fifth subband spectral envelopes; and adjusting the sixth spectral coefficient based on the fourth subband spectral envelope and the fifth subband spectral envelope, and adjusting the sixth spectral coefficient based on the fourth subband spectral envelope and the third subband spectral envelope, to obtain the fifth spectral coefficient.

This solution provides another method of adjusting the sixth spectral coefficient based on the fourth subband spectral envelope and the third subband spectral envelope. In this solution, in addition to adjusting the sixth spectral coefficient based on the fourth subband spectral envelope and the third subband spectral envelope, the sixth spectral coefficient may also be adjusted based on a fifth subband spectral envelope and the fourth subband spectral envelope, the fifth subband spectral envelope being the same as the fourth subband spectral envelope and being obtained through prediction based on the first spectral coefficient corresponding to the low-frequency part through a neural network. For a specific adjustment manner, refer to the foregoing manner of adjustment based on the fourth subband spectral envelope and the third subband spectral envelope. With this solution, the spectral coefficient may be adjusted based on both the decoding result of the second substream of the high-frequency part and the decoding result of the first substream of the low-frequency part, so that an adjusted spectral coefficient that is more accurate may be obtained.

An order of performing the operation of adjusting the sixth spectral coefficient based on the fourth subband spectral envelope and the fifth subband spectral envelope and the operation of adjusting the sixth spectral coefficient based on the fourth subband spectral envelope and the third subband spectral envelope is not limited in an example embodiment of the disclosure. For example, the sixth spectral coefficient may be adjusted first based on the fourth subband spectral envelope and the fifth subband spectral envelope, and then the adjusted sixth spectral coefficient is adjusted again based on the fourth subband spectral envelope and the third subband spectral envelope.

In some embodiments, in a case that the bitstream includes at least two second substreams, the performing reconstruction based on the first substream and the at least one second substream to obtain a fourth subband signal and a fifth subband signal includes: decoding the first substream, and obtaining a first spectral coefficient based on a decoding result; decoding each second substream, and obtaining, based on a decoding result, a subband spectral envelope corresponding to the each second substream; obtaining a seventh spectral coefficient by copying the first spectral coefficient; adjusting the seventh spectral coefficient based on the subband spectral envelope corresponding to the each second sub stream, to obtain an eighth spectral coefficient; and obtaining the fourth subband signal and the fifth subband signal based on the first spectral coefficient and the eighth spectral coefficient.

During actual application, if multiple second substreams are obtained, during speech signal reconstruction based on the first substream and the second substream, any one of the obtained second substreams may be used. For example, a bitstream with the highest encoding quality in the obtained second substreams may be used, or multiple or all of the obtained second substreams may be used.

When at least two second substreams are used, for each second substream, a seventh spectral coefficient may be adjusted in the foregoing manner of adjusting the sixth spectral coefficient described above. If two second substreams are used, the seventh spectral coefficient may be first adjusted based on one of the two second substreams, and then the adjusted spectral coefficient is adjusted again based on the other one of the two second sub streams.

After the fourth subband signal corresponding to the low-frequency part and the fifth subband signal corresponding to the high-frequency part are obtained, the reconstructed speech signal may be obtained based on the two signals. For example, the low-frequency subband signal and the high-frequency subband signal may be obtained by processing a speech signal by a QMF analysis filter. Correspondingly, the obtaining the decoded speech signal based on the fourth subband signal and the fifth subband signal may be obtaining the reconstructed speech signal based on the fourth subband signal and the fifth subband signal by using a QMF synthesis filter.

In order to better illustrate the encoding method and the decoding method provided in the embodiments of the disclosure, the encoding method and the decoding method are described in further detail below with reference to some specific examples.

Example 1

Figure 5:
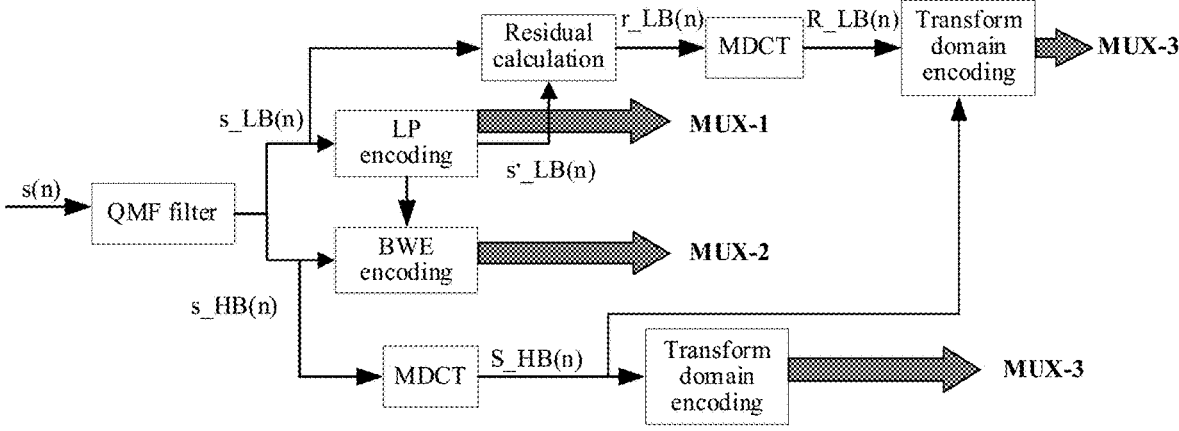
FIG. 5 is a schematic principle diagram of a speech signal encoding method in an example according to an embodiment of the disclosure.

In an example, FIG. 5 is a schematic flowchart of a speech signal encoding method according to an embodiment of the disclosure. In this example, a first encoding method is an LP encoding method, and second encoding methods include an encoding method based on BWE (that is, BWE encoding shown in the figure) and a transform domain encoding method. In this example, an original speech signal of a time domain is denoted as s(n). As shown in FIG. 5, a procedure of the speech signal encoding method in this example may include the following operations:

Assuming that a sampling rate of a speech signal s(n) is Fs, after the speech signal s(n) goes through the QMF analysis filter (a QMF filter shown in the figure) and downsampling by 2, a low-pass signal s_LB(n)(that is, a low-frequency subband signal) and a high-pass signal s_HB (n) (that is, a high-frequency subband signal) may be obtained.

In a first aspect, the low-frequency subband signal is encoded through LP encoding, and related parameters are written into the bit stream. The related parameters may include, but is not limited to: a signal type, an LSF quantization index value, a LTP quantization index value, an excitation signal quantization index value, and the like. In this example, a related bitstream segment may be a mixed stream MUX-1, and the bitstream segment is the first substream.

In a second aspect, in this example, an encoding method based on BWE centered on the frequency domain is used as an example. Quantization encoding is performed on spectral envelope information of the high-frequency subband signal. An obtained related bitstream segment may be denoted as MUX-2, and this bitstream segment is one second sub stream.

In a third aspect, transform domain encoding is performed. An obtained related bitstream segment may be denoted as MUX-3, and this bitstream is another second substream. An input of the transform domain encoding may be the signal obtained by performing LP encoding on the low-frequency subband signal and a residual signal of the original low-frequency subband signal, combined with the original high-frequency subband signal, or only the high-frequency subband signal may be processed.

As shown in FIG. 5, one manner is to perform residual calculation on the low-frequency subband signal and a signal s_LB (n) obtained by performing LP encoding on the low-frequency subband signal s_LB(n) to obtain a residual signal r_LB(n), and after a time-frequency transform (in this example, MDCT is used as an example) is performed on each of the residual signal r_LB(n) and the high-frequency subband signal s_HB(n), frequency domain signals R_LB(n) and S_HB(n) are obtained. Subsequently, R_LB(n) and S_HB(n) may be encoded by using a regular transform domain encoding method to obtain MUX-3. Another manner may be directly performing a time-frequency transform on the high-frequency subband signal s_HB(n) to obtain S_HB (n), and then encoding S_HB(n) by using a regular transform domain to obtain MUX-3.

In the foregoing examples of the embodiments of the disclosure, for ease of description, that a transform domain encoding technology is applied to a high-pass signal part is used as an example for description. However, the disclosure does not limit the use of the transform domain encoding technology for enhancement of a residual signal of a low-pass signal. In the foregoing encoding procedure, there is no essential change in framework implementation with ITU-T G.729.1, G.718, and EVS, and no further detail is provided herein.

In the following examples, a procedure of decoding, by a decoder side, a bitstream obtained by using the encoding method shown in FIG. 5, to obtain a reconstructed speech signal is described by way of example.

Example 2

Figure 6:
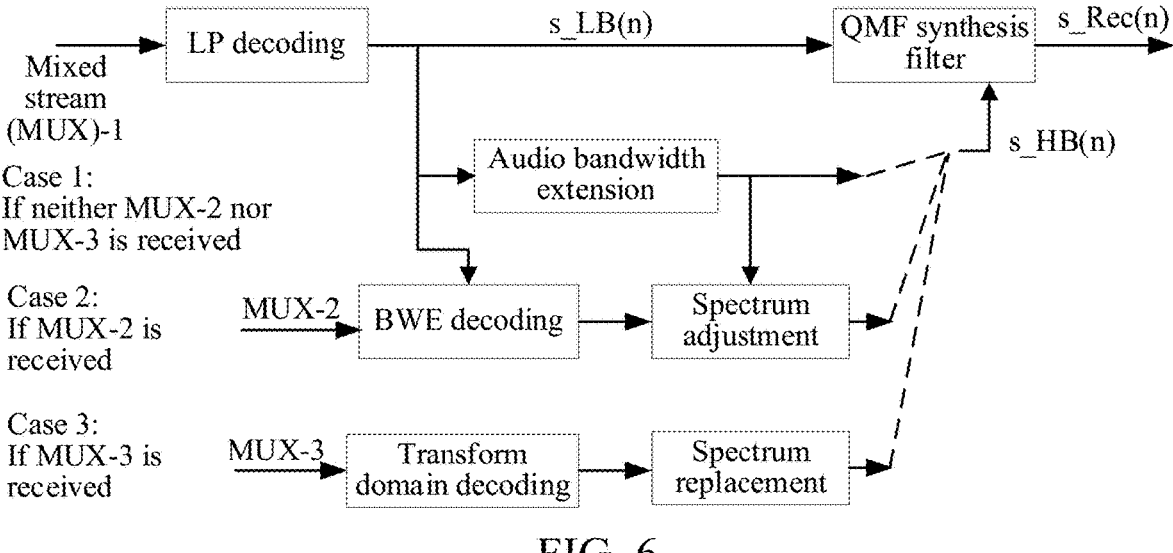
FIG. 6 is a schematic principle diagram of a speech signal decoding method in an example according to an embodiment of the disclosure.

In an example, FIG. 6 is a schematic flowchart of a decoding method. As shown in FIG. 6, the decoding procedure may mainly include:

(1) Call an LP decoder based on a received bitstream MUX-1, to generate a signal of a low-pass part, that is, obtain a first subband signal based on a first substream.

(2) If the decoder side does not receive a second substream MUX-2 or MUX-3, that is, Case 1 shown in FIG. 6, directly call audio bandwidth extension, to generate a signal of a high-pass part, to ensure that for a signal s_Rec(n) generated on the decoder side, a sampling rate of Fs may be obtained at any moment.

(3) If the decoder side also receives a bitstream MUX-2, that is, Case 2 shown in FIG. 6, decode MUX-2 to obtain a spectral envelope, on the basis of this, adjust, based on the spectral envelope obtained through decoding, spectral envelope information obtained through audio bandwidth extension, and regenerate a spectrum.

(4) If the decoder side also receives a bitstream MUX-3, that is, Case 3 shown in FIG. 6, decode the bitstream MUX-3 to obtain normalized coefficients of subbands, and multiply the normalized coefficients by corresponding spectral envelope values, to replace spectrums of the corresponding subbands.

(5) Upsample the generated low-pass signal and high-pass signal by 2, and then call the QMF synthesis filter to reconstruct a signal with a sampling rate of Fs.

The foregoing decoding operations are described in detail below with reference to several solutions.

Operation 1: Reconstruction of a Low-Pass Signal

An obtained bitstream MUX-1 may be decoded by using an OPUS-LP decoding mode, to obtain a low-pass signal of a main part, that is, a first subband signal.

Operation 2: Reconstruction of a High-Pass Signal Based on an Audio Bandwidth Extension Technology For ease of description, it is assumed that an original speech signal has a sampling rate of Fs=32000 Hz and a frame length of 20 ms. Therefore, for a low-frequency subband signal or a high-frequency subband signal corresponding to the original speech signal, there are 640 sample points in each frame. For a low-frequency subband signal or a high-frequency subband signal with Fs=16000 Hz, a 50% overlapping MDCT may be used as an example, and after combination and window addition of two consecutive frames each of 20 ms, the MDCT is performed, and 320 MDCT coefficients may be obtained.

On the decoder side, based on the low-pass signal obtained in operation 1, spectrums related to 0-7000 Hz may be obtained through LP analysis, corresponding to spectral coefficients within a range of 0-279 of low-frequency MDCT coefficients (briefly referred to as first low-frequency coefficients).

Different reception cases of the bitstreams may correspond to different reconstruction manners. Description is provided below with reference to the different reconstruction manners.

Reconstruction Manner 1: High-Pass Signal Reconstruction Based on Low-Pass Signals If the decoder side does not obtain the bitstream MUX-2 or the bitstream MUX-3, this operation may be specifically implemented in the manner described in the foregoing implementation 1 or implementation 2. That is, based on the 280 first low-frequency coefficients obtained through LP analysis, 280 spectral coefficients are obtained through a 280-to-280 mapping network (that is, the first neural network model), and the 280 spectral coefficients include 40 second low-frequency coefficients and 240 first high-frequency coefficients. Alternatively, envelope values of 14 subband spectral envelopes may be obtained based on 280 first low-frequency coefficients through a 280-to-14 mapping network (that is, the second neural network model). 280 spectral coefficients obtained by copying coefficients within a range of 140-279 of the first low-frequency coefficients are adjusted based on the 14 envelope values, to obtain the second low-frequency coefficients and the first high-frequency coefficients.

After the second low-frequency coefficients and the first high-frequency coefficients are obtained, the second low-frequency coefficients may be MDCT inverse transformed, go through a combination operation with s_LB(n) obtained through LP decoding, and are then upsampled by 2. A low-pass branch of the QMF synthesis filter is called to obtain, through reconstruction, a low-pass reconstruction signal, that is, the second subband signal. The first high-frequency coefficients are MDCT inverse transformed and combined with first high-pass coefficients and 80 zero coefficients, to obtain 320 MDCT coefficients. The 320 coefficients are MDCT inverse transformed, to generate a time domain signal. The time domain signal is upsampled by 2, and a high-pass branch of the QMF synthesis filter is called to obtain, through reconstruction, a high-pass reconstruction signal, that is, a third subband signal (s_HB(n) shown in FIG. 6). Finally, the low-pass reconstruction signal and the high-pass reconstruction signal obtained through reconstruction are summed to obtain the reconstructed signal s_Rec(n).

Reconstruction Manner 2: High-Pass Signal Reconstruction Based on BWE

Compared with bandwidth extension, BWE needs to parse the bitstream MUX-2 to obtain corresponding parameters. For example, the bitstream MUX-2 may be parsed (BWE decoding shown in FIG. 6) to obtain a quantization value of a spectral envelope that is used for calculating a true MDCT coefficient on the encoder side, to obtain an estimated spectral envelope. For ease of description, the estimated spectral envelope is referred to as a second estimated spectral envelope (which may correspond to the third subband spectral envelope described above).

For the second low-pass coefficient and the first high-pass coefficient (which may be coefficients obtained by copying the first low-pass coefficient, or may be coefficients obtained by adjusting a copied coefficient) obtained in the foregoing reconstruction manner 1, a first estimated spectral envelope (corresponding to the fourth subband spectral envelope described above) may be obtained based on these coefficients.

Subsequently, in the logarithmic domain, coefficients in corresponding subbands (such as the second low-pass coefficient and the first high-pass coefficient obtained in the foregoing reconstruction manner 1) may be adjusted (the spectrum adjustment operation shown in the figure) according to a difference between the first estimated spectral envelope and the second estimated spectral envelope, to generate an adjusted second low-pass coefficient and an adjusted first high-pass coefficient.

Similarly, after the adjusted second high-pass coefficient and the adjusted first high-pass coefficient are obtained, the manner described in the foregoing reconstruction manner 1 may be used to obtain the reconstructed signal s_Rec(n).

Reconstruction Manner 3: High-Pass Signal Reconstruction Based on Transform Domain Encoding In this example, for better understanding of the solution, before the reconstruction operation is described, an operation procedure of the transform domain encoding is described first. The procedure of encoding the high-frequency subband signal on the encoder side may include:

(1) Divide the high-frequency subband signal into a specified quantity of subbands, such as 14 subbands, each subband being corresponding to 20 spectral coefficients, and normalize spectral coefficients in each subband to obtain a normalized coefficient corresponding to each subband.

(2) Sort the 14 subbands by perceptual importance. One implementation method includes: performing sorting in descending order of values of subband spectral envelopes of the subbands. Certainly, other sorting manners may alternatively be used. This is not limited in an example embodiment of the disclosure. For example, natural sorting may be used.

(3) In each subband, further decompose the 20 normalized coefficients into five four-dimensional vectors, perform vector quantization on the four-dimensional vectors, and record quantized index values.

(4) Sequentially write index values of the vector quantization of each subband according to the order of perceptual sorting into the bitstream MUX-3.

According to the foregoing description of the encoder side, when MUX-1 and MUX-3 are obtained, the decoder side may correspond to various different signal reconstruction manners. For example, a solution similar to that in the foregoing reconstruction manner 2 may be used to obtain a subband spectral envelope based on a decoding result of MUX-3. The coefficients (such as the second low-pass coefficient and the first high-pass coefficient obtained in the foregoing reconstruction manner 1, or the adjusted second low-pass coefficient and the adjusted first high-pass coefficient obtained in the foregoing reconstruction manner 2) in the corresponding subbands are adjusted based on the subband spectral envelope and the first estimated spectral envelope obtained based on the decoding result of MUX-1, to obtain an adjusted second low-pass coefficient and an adjusted first high-pass coefficient. Subsequently, the reconstructed signal s_Rec(n) is obtained based on the adjusted second low-pass coefficient and the adjusted first high-pass coefficient by using the manner described above.

When the decoder side may obtain MUX-1, MUX-2, and MUX-3, the following manner may further be used for signal reconstruction. This manner may include the following operations:

(1) Decode MUX-1 to obtain s_LB(n).

(2) For MUX-2, use the operations in the reconstruction manner 2 to obtain values of the second estimated spectral envelopes, such as 14 envelope values, and sort the envelope values of the 14 subbands in a selected order consistent with the order on the encoder side in the foregoing transform domain encoding.

(3) Sequentially parse MUX-3 to obtain index values of vector quantization, and perform calculation according to the index values to obtain normalized coefficients corresponding to the 14 subbands.

(4) Perform calculation based on an obtained first normalization coefficient to obtain a third estimated spectral envelope. In the logarithmic domain, adjust the coefficients (such as the second low-pass coefficient and the first high-pass coefficient obtained in the foregoing reconstruction manner 1, or the adjusted second low-pass coefficient and the adjusted first high-pass coefficient obtained in the foregoing reconstruction manner 2) in the corresponding subbands according to a difference between the third estimated spectral envelope and the second estimated spectral envelope (corresponding to the spectrum replacement operation shown in FIG. 6), to obtain the adjusted second low-pass coefficient and the adjusted first high-pass coefficient.

Subsequently, after the adjusted second high-pass coefficient and the adjusted first high-pass coefficient are obtained, the manner described in the foregoing reconstruction manner 1 may be used to obtain the reconstructed signal s_Rec(n).

Example 3

Figure 7:
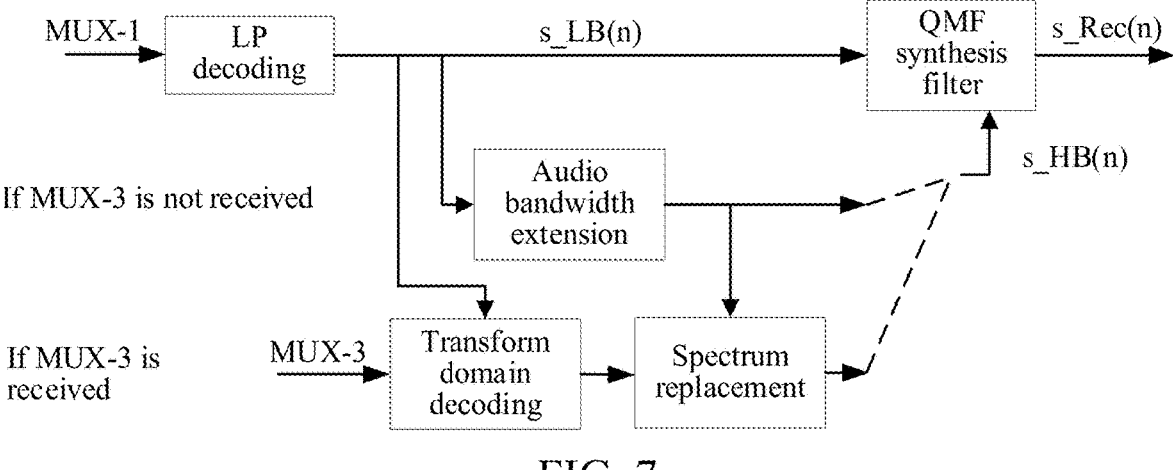
FIG. 7 is a schematic principle diagram of a speech signal decoding method in another example according to an embodiment of the disclosure.

FIG. 7 is a schematic flowchart of a speech signal decoding method provided in this example. In this example, a first encoding method of an encoder side is an LP time domain encoding method, and a second encoding method is a transform domain encoding method. On the encoder side, an operation of encoding a low-frequency subband signal by using the LP encoding method to obtain MUX-1, and encoding a high-frequency subband signal by using the transform domain encoding method to obtain MUX-3 may include:

(1) In this example, because the high-frequency subband signal is not encoded based on BWE, there is no high-frequency envelope value in a bitstream. In this case, the data in the foregoing description may still be used as an example, to perform natural ordering on the 14 subbands of the high-frequency subband signal in an order from low frequencies to high frequencies. Each subband corresponds to 20 spectral coefficients.

(2) In each subband, the 20 spectral coefficients are normalized, the 20 normalized coefficients are further decomposed into five four-dimensional vectors, vector quantization is performed on the four-dimensional vectors, and quantized index values are recorded.

(3) Index values of the vector quantization of each subband are sequentially written into the bitstream MUX-3 in the natural order from low frequencies to high frequencies.

Corresponding to the encoding method, as shown in FIG. 7, a decoding procedure on the decoder side in this example may be as follows:

Operation 1: For an implementation of the operation of reconstruction of a low-pass signal, reference may be made to the foregoing description, that is, LP decoding is performed on MUX-1 to obtain s_LB(n).

Operation 2: Reconstruction of a high-pass signal.

In this operation, in one case, the decoder side does not receive MUX-3. Therefore, the audio bandwidth extension processing method described above may be used to implement reconstruction of the high-pass signal based on the decoding result of MUX-1. For example, with the solution described in the foregoing reconstruction manner 1, the spectral coefficient obtained through copying is adjusted by using the envelope difference, to obtain the adjusted second low-pass coefficient and the adjusted first high-pass coefficient.

In another case, the decoder side receives MUX-3. In this case, the procedure of the reconstruction of the high-pass signal is as follows:

(1) Based on the decoding result of MUX-1, obtain a second low-pass coefficient and a first high-pass coefficient (which may also be spectral coefficients obtained by copying the first low-pass coefficient, or may be spectral coefficients obtained by adjusting the first low-pass coefficient obtained through copying), and obtain a first estimated spectral envelope based on the second low-pass coefficient and the first high-pass coefficient.

(2) Sequentially parse the bitstream MUX-3 to obtain index values of vector quantization, and perform calculation to obtain normalized coefficients.

(3) Based on a first normalization coefficient, calculate a third estimated spectral envelope (in this example, a spectral envelope obtained based on MUX-3 is still briefly referred to as a third estimated spectral envelope).

(4) In the logarithmic domain, adjust coefficients (that is, the second low-pass coefficient and the first high-pass coefficient obtained based on the decoding result of MUX-1) in the corresponding subbands according to a difference between the third estimated spectral envelope and the first estimated spectral envelope, to obtain an adjusted second low-pass coefficient and an adjusted first high-pass coefficient.

Operation 4: Generation of the Reconstructed Signal

According to an actual reception case of MUX-3, and based on the adjusted second low-pass coefficient and the adjusted first high-pass coefficient obtained in operation 3, the reconstructed speech signal s_LB(n) is obtained. For example, the second low-pass coefficients are MDCT inverse transformed, go through a combination operation with s_LB(n) obtained through LP decoding, and are upsampled by 2. A low-pass branch of the QMF synthesis filter is called to obtain, through reconstruction, a reconstructed signal corresponding to the low-pass part. The first high-frequency coefficients are combined with first high-pass coefficients and 80 zero coefficients, to generate 320 MDCT coefficients. The 320 MDCT coefficients are MDCT inverse transformed, to generate a time domain signal. Subsequently, the time domain signal is upsampled by 2, and a high-pass branch of the QMF synthesis filter is called to obtain, through reconstruction, a reconstructed signal s_HB (n) corresponding to the high-pass part. Subsequently, a first low-pass reconstruction signal and a first high-pass reconstruction signal are summed to obtain the reconstructed signal s_Rec(n).

It would be understood that, the foregoing examples are merely several implementations of the methods provided in the embodiments of the disclosure. During actual application, the implementations may be adjusted according to different application requirements and application scenarios. For example, for the methods shown in the foregoing examples, the two encoding methods, namely, LP encoding and encoding based on BWE, may also be used to obtain one first substream and one second substream, or more encoding methods may be used to obtain substreams corresponding to different encoding methods. On the decoder side, the reconstruction of the speech signal may be performed according to the actually obtained substreams.

In the encoding and decoding methods provided in the embodiments of the disclosure, an inputted signal (a signal to be encoded, that is, an original speech signal) is encoded based on bands and layers (that is, subband signals are encoded by using different encoding methods). Corresponding to the encoding method, the decoder side at least may recover, at any time by using the audio bandwidth extension method, a speech signal consistent with the signal to be encoded, thereby ensuring that a sampling rate of an outputted signal is consistent with that of the originally inputted signal. Further, when obtaining a status of a sub stream corresponding to the high-frequency part, the decoder side may perform a transformation or replacement operation on a spectrum according to a high layer bitstream status obtained by the decoder side, so as to further improve subjective quality of the reconstructed speech signal. The solutions of the embodiments of the disclosure may achieve scalable and more flexible encoding and decoding methods based on the widely used OPUS encoding method. When a core layer (a substream corresponding to the low-frequency subband signal) is received, high-quality and wide-band reconstruction of speech signals may be achieved.

The speech signal encoding and decoding methods provided in the embodiments of the disclosure may be applied to any application scenario requiring encoding and/or decoding, such as an online voice call scenario or an audio file or video file transmission scenario. In other words, the solutions provided in the embodiments of the disclosure are applicable provided that the application scenario involves audio encoding and decoding.

For example, in a voice call scenario, a speech signal of each caller needs to be encoded and compressed before being transmitted to another caller, and the another caller needs to decode a received bitstream to reconstruct and play the speech signal.

Based on the solution provided in an example embodiment of the disclosure, the receiver side of the speech signal may obtain a speech signal with acceptable quality, through reconstruction, provided that the receiver side may receive a sub stream corresponding to a low-frequency subband signal, and may obtain a reconstructed signal with high quality when further receiving a substream corresponding to a high-frequency subband signal. Therefore, the solution provided in an example embodiment of the disclosure may effectively avoid a problem that a speech signal cannot be recovered on a decoder side once a packet loss occurs, and a speech signal with high quality may be recovered when a network state is favorable, thereby effectively ensuring auditory perception of conference participants.

Figure 8:
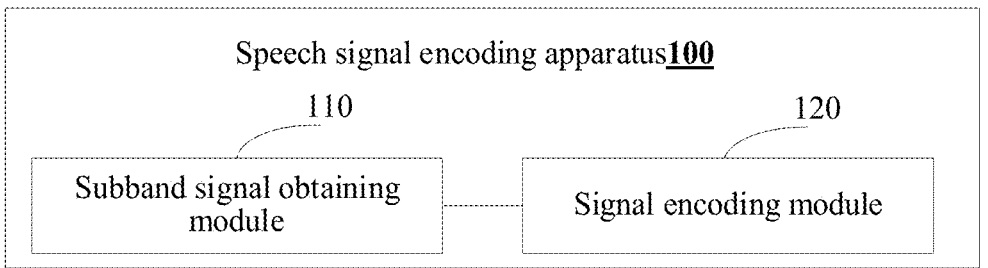
FIG. 8 is a schematic structural diagram of a speech signal encoding apparatus according to an embodiment of the disclosure.

Based on the same principle as the encoding method provided in the embodiments of the disclosure, an embodiment of the disclosure further provides a speech signal encoding apparatus. FIG. 8 is a schematic structural diagram of a speech signal encoding apparatus according to an embodiment of the disclosure. As shown in FIG. 8, the speech signal encoding apparatus 100 may include a subband signal obtaining module 110 and a signal encoding module 120.

The subband signal obtaining module 110 is configured to obtain a low-frequency subband signal and a high-frequency subband signal of an original speech signal.

The signal encoding module 120 is configured to encode the low-frequency subband signal by using a first encoding method, to obtain a first substream; and configured to encode the high-frequency subband signal by using at least one second encoding method, to obtain each second substream corresponding to each second encoding method.

For example, the first encoding method includes an OPUS encoding method. For example, the second encoding method includes an encoding method based on BWE and/or a transform domain encoding method.

For example, the first encoding method is a time domain encoding method, and the second encoding method includes a transform domain encoding method. In this case, when encoding the high-frequency subband signal by using the transform domain encoding method, the signal encoding module 120 is configured to: encode the high-frequency subband signal or encode the high-frequency subband signal and the residual signal by using the transform domain encoding method, the residual signal being a residual signal between an encoding result of the low-frequency subband signal and the low-frequency subband signal.

Figure 9:
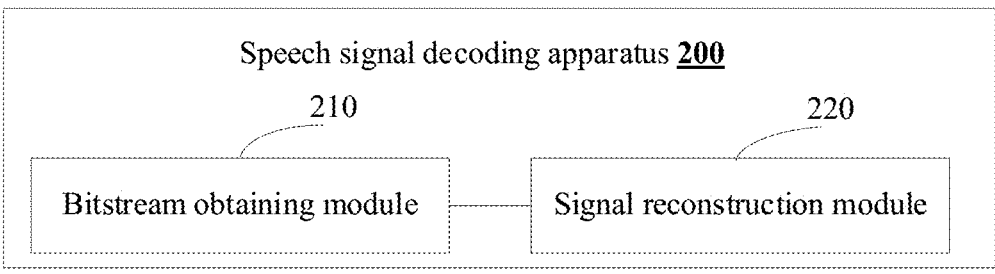
FIG. 9 is a schematic structural diagram of a speech signal decoding apparatus according to an embodiment of the disclosure.

For example, during transmission of the original speech signal, a transmission priority of the first substream is higher than that of the each second substream. In a case that at least two second encoding methods are used, transmission priorities of the second substreams are different, and higher transmission priority indicates higher encoding quality of a bitstream.

based on the same principle as the decoding method provided in the embodiments of the disclosure, an embodiment of the disclosure further provides a speech signal decoding apparatus. FIG. 9 is a schematic structural diagram of a speech signal decoding apparatus according to an embodiment of the disclosure. As shown in FIG. 9, the speech signal decoding apparatus 200 may include a bitstream obtaining module 210 and a signal reconstruction module 220.

The bitstream obtaining module 210 is configured to obtain a bitstream to be decoded, the bitstream including a first substream, and the first substream being a bitstream obtained by encoding a low-frequency subband signal of an original speech signal by using a first encoding method.

The signal reconstruction module 220 is configured to perform signal reconstruction based on the first substream in a case that the bitstream includes no second substream, to obtain a reconstructed speech signal; and configured to perform signal reconstruction based on the first substream and at least one second substream in a case that the bitstream includes the at least one second sub stream, to obtain a reconstructed speech signal. Each second substream is obtained by encoding a high-frequency subband signal of the original speech signal, and is encoded by using a second encoding method corresponding to the each second substream.

For example, when performing signal reconstruction based on the first substream, to obtain the reconstructed speech signal, the signal reconstruction module 220 is configured to: decode the first substream to obtain a first subband signal; and perform reconstruction based on the first subband signal to obtain a second subband signal corresponding to the low-frequency subband signal and a third subband signal corresponding to the high-frequency subband signal, and obtain a decoded speech signal based on the second subband signal and the third subband signal.

For example, when performing reconstruction based on the first subband signal to obtain the second subband signal and the third subband signal, the signal reconstruction module 220 is configured to: determine a first spectral coefficient of the first subband signal; and perform prediction based on the first spectral coefficient by using a first neural network model to obtain a second spectral coefficient, and obtain the second subband signal and the third subband signal based on the first spectral coefficient and the second spectral coefficient.

For example, when performing reconstruction based on the first subband signal to obtain the second subband signal and the third subband signal, the signal reconstruction module 220 is configured to: obtain a third spectral coefficient by copying the first spectral coefficient; obtain a first specified quantity of first subband spectral envelopes based on the third spectral coefficient; perform prediction based on the first spectral coefficient by using a second neural network model to obtain the first specified quantity of second subband spectral envelopes; adjust the third spectral coefficient based on the first subband spectral envelope and the second subband spectral envelope to obtain a fourth spectral coefficient; and obtain the second subband signal and the third subband signal based on the first spectral coefficient and the fourth spectral coefficient.

For example, when performing signal reconstruction based on the first substream and the at least one second substream, to obtain the reconstructed speech signal, the signal reconstruction module 220 is configured to: reconstruct a fourth subband signal corresponding to the low-frequency subband signal and a fifth subband signal corresponding to the high-frequency subband signal based on the first substream and the at least one second sub stream; and obtain the decoded speech signal based on the fourth subband signal and the fifth subband signal.

For example, in a case that there is one second substream, when performing reconstruction based on the first substream and the at least one second substream to obtain the fourth subband signal and the fifth subband signal, the signal reconstruction module 220 is configured to: decode the first substream, and obtain a first spectral coefficient based on a decoding result; decode the second substream, and obtain a fifth spectral coefficient based on a decoding result; and respectively obtain the fourth subband signal and the fifth subband signal based on the first spectral coefficient and the fifth spectral coefficient.

For example, when decoding the second substream, and obtaining the fifth spectral coefficient based on the decoding result, the signal reconstruction module 220 is configured to: decode the second sub stream, and obtain a second specified quantity of third subband spectral envelopes based on a decoding result; obtain a sixth spectral coefficient by copying the first spectral coefficient; obtain the second specified quantity of fourth subband spectral envelopes based on the sixth spectral coefficient; and adjust the sixth spectral coefficient based on the fourth subband spectral envelope and the third subband spectral envelope to obtain the fifth spectral coefficient.

For example, when adjusting the sixth spectral coefficient based on the fourth subband spectral envelope and the third subband spectral envelope to obtain the fifth spectral coefficient, the signal reconstruction module 220 is configured to: perform prediction based on the first spectral coefficient by using a third neural network model to obtain the second specified quantity of fifth subband spectral envelopes; and adjust the sixth spectral coefficient based on the fourth subband spectral envelope and the fifth subband spectral envelope, and adjust the sixth spectral coefficient based on the fourth subband spectral envelope and the third subband spectral envelope, to obtain the fifth spectral coefficient.

For example, in a case that the bitstream includes at least two second substreams, when performing reconstruction based on the first substream and the at least one second sub stream to obtain the fourth subband signal and the fifth subband signal, the signal reconstruction module 220 is configured to: decode the first substream, and obtain a first spectral coefficient based on a decoding result; decode each second substream, and obtain, based on a decoding result, a subband spectral envelope corresponding to the each second substream; obtain a seventh spectral coefficient by copying the first spectral coefficient; adjust the seventh spectral coefficient based on the subband spectral envelope corresponding to the each second substream, to obtain an eighth spectral coefficient; and respectively obtain the fourth subband signal and the fifth subband signal based on the first spectral coefficient and the eighth spectral coefficient.

For example, the low-frequency subband signal and the high-frequency subband signal are obtained by processing a speech signal by a QMF analysis filter. When obtaining the decoded speech signal based on the second subband signal and the third subband signal, the signal reconstruction module 220 is configured to: obtain the decoded speech signal based on the second subband signal and the third subband signal by using a QMF synthesis filter.

When obtaining the decoded speech signal based on the fourth subband signal and the fifth subband signal, the signal reconstruction module 220 is configured to: obtain the decoded speech signal based on the fourth subband signal and the fifth subband signal by using a QMF synthesis filter.

Clearly, for a person of ordinary skill in the art, the apparatus provided in the embodiments of the disclosure is an apparatus that may perform the method in the embodiments of the disclosure. Therefore, based on the method provided in the embodiments of the disclosure, a person skilled in the art may learn specific implementations of the apparatus in the embodiments of the disclosure and various variations thereof, and a manner in which the apparatus implements the method in the embodiments of the disclosure is not described in detail herein. All apparatuses used when a person skilled in the art implements the method in the embodiments of the disclosure shall fall within the protection scope of the disclosure.

Based on the same principle of the method and apparatus provided in the embodiments of the disclosure, an embodiment of the disclosure further provides an electronic device. The electronic device includes a memory and a processor. The memory is configured to store a computer program. The processor is configured to perform the method shown in any one of the embodiments of the disclosure during execution of the computer program.

The embodiments of the disclosure further provide a computer-readable storage medium, storing a computer program, the computer program, when being executed by a processor, performing the method shown in any one of the embodiments of the disclosure.

Figure 10:
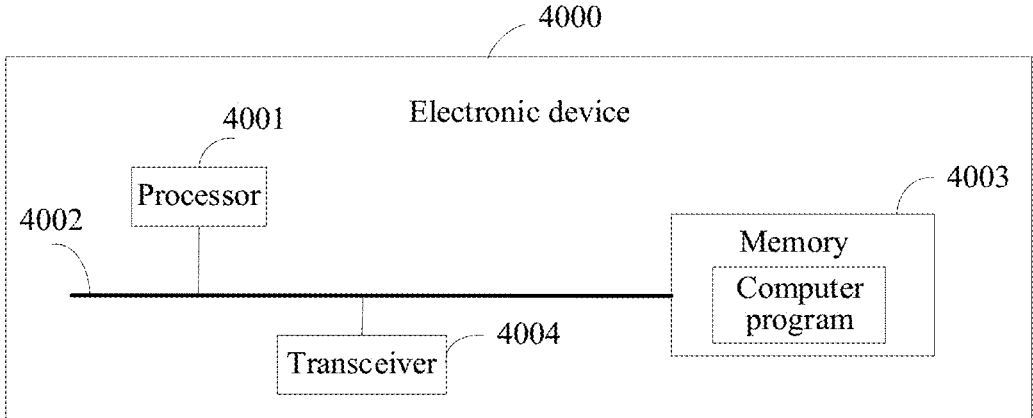
FIG. 10 is a schematic structural diagram of an electronic device according to an embodiment of the disclosure.

In some embodiments, the embodiments of the disclosure provide an electronic device for encoding and decoding a speech signal. The electronic device may be various types of terminal devices or servers. The server may be an independent physical server, or may be a server cluster or a distributed system including a plurality of physical servers. FIG. 10 is a schematic structural diagram of an electronic device according to an embodiment of the disclosure. As shown in FIG. 10, an electronic device 4000 includes a processor 4001 and a memory 4003. The processor 4001 and the memory 4003 are connected, for example, are connected by a bus 4002. For example, the electronic device 4000 may further include a transceiver 4004. During actual application, there may be one or more transceivers 4004. The structure of the electronic device 4000 does not constitute a limitation on an example embodiment of the disclosure.

The processor 4001 may be a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processor may implement or perform various examples of logic blocks, modules, and circuits described with reference to content disclosed in the disclosure. The processor 4001 may alternatively be a combination to implement a computing function, for example, may be a combination of one or more microprocessors, or a combination of a DSP and a microprocessor.

The bus 4002 may include a channel, to transmit information between the foregoing components. The bus system

4002 may be a peripheral component interconnect (PCI) bus, an extended industry standard architecture (EISA) bus, or the like. The bus 4002 may be classified into an address bus, a data bus, a control bus, and the like. For ease of description, the bus in FIG. 10 is represented by using only one bold line, but which does not indicate that there is only one bus or one type of bus.

The memory 4003 may be a read-only memory (ROM) or a static storage device of another type that may store static information and instructions, a random access memory (RAM) or a dynamic storage device of another type that may store information and instructions, or an electrically erasable programmable read-only memory (EEPROM), a compact disc read-only memory (CD-ROM) or other optical disk storage, optical disc storage (including a compact disc, a laser disc, an optical disc, a digital versatile disc, or a Blu-ray disc, a disk storage medium or another magnetic storage device, or any other medium that may be used to carry or store expected program code in a command or data structure form and that may be accessed by a computer, but is not limited thereto.

The memory 4003 is configured to store application program code for performing the solutions of the disclosure, and the application program code is executed under control of the processor 4001. The processor 4001 is configured to execute the application program code stored in the memory 4003 to implement the content shown in any one of the foregoing method embodiments.

The technical solution provided in the embodiments of the disclosure has the following beneficial effects: Based on the decoding method of the embodiments of the disclosure, after a bitstream to be decoded is obtained, if the bitstream includes only a first substream, reconstruction may be performed based on the substream to obtain a speech signal with acceptable quality. If the bitstream further includes a second substream, signal reconstruction may be based on the first sub stream and the second sub stream, to obtain a speech signal with high speech quality through reconstruction. Based on the solution, a possibility of obtaining a speech signal through reconstruction on a decoder side may be effectively ensured, thereby effectively avoiding a problem that no speech signal may be obtained through reconstruction on the decoder side. In addition, a high-quality speech signal may be obtained through reconstruction in a case that a second substream may be obtained, thereby better meeting an actual application requirement.

It is to be understood that, although the operations in the flowchart in the accompanying drawings are sequentially shown according to indication of an arrow, the operations are not necessarily sequentially performed according to a sequence indicated by the arrow. Unless explicitly specified in this specification, execution of the operations is not strictly limited in the sequence, and the operations may be performed in other sequences. In addition, at least some operations in the flowcharts in the accompanying drawings may include a plurality of suboperations or a plurality of stages. The suboperations or the stages are not necessarily performed at the same moment, but may be performed at different moments. The suboperations or the stages are not necessarily performed in sequence, but may be performed in turn or alternately with another operation or at least some of suboperations or stages of the another operation.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are some implementations of the disclosure. A person of ordinary skill in the art may make several improvements and refinements without departing from the principle of the disclosure, and the improvements and refinements shall fall within the protection scope of the disclosure.

What is claimed is:

1. A speech signal decoding method, performed by at least one processor, the method comprising:
obtaining a bitstream to be decoded, the bitstream comprising a first substream, and the first substream being a bitstream obtained by encoding a low-frequency subband signal of an original speech signal by using a first encoding method, which includes a time domain encoding method; and
obtaining a reconstructed speech signal by:
performing first signal reconstruction based on the first substream when the bitstream includes no second substream; and
performing second signal reconstruction based on the first substream and at least one second substream when the bitstream includes the at least one second substream,
each second substream being obtained by encoding a high-frequency subband signal of the original speech signal and a residual signal, the encoding of the high-frequency subband signal and the residual signal being performed by using a second encoding method, which includes a transform domain encoding method, and the residual signal being derived from a result of encoding the low-frequency subband signal and the low-frequency subband signal,
wherein the performing the first signal reconstruction comprises:
decoding the first substream to obtain a first subband signal;
determining a first spectral coefficient of the first subband signal;

30 performing prediction based on the first spectral coefficient by using a neural network model, to obtain a second spectral coefficient; and
obtaining a decoded speech signal based on the first spectral coefficient and the second spectral coefficient.

2. The method according to claim 1, wherein the obtaining the decoded speech signal comprises:
obtaining a second subband signal corresponding to the low-frequency subband signal and a third subband signal corresponding to the high-frequency subband signal, based on the first spectral coefficient and the second spectral coefficient; and
obtaining the decoded speech signal based on the second subband signal and the third subband signal.

3. A speech signal decoding method, performed by at least one processor, the method comprising:
obtaining a bitstream to be decoded, the bitstream comprising a first substream, and the first substream being a bitstream obtained by encoding a low-frequency subband signal of an original speech signal by using a first encoding method, which includes a time domain encoding method; and
obtaining a reconstructed speech signal by:
performing first signal reconstruction based on the first substream when the bitstream includes no second substream; and
performing second signal reconstruction based on the first substream and at least one second substream when the bitstream includes the at least one second substream,
each second substream being obtained by encoding a high-frequency subband signal of the original speech signal and a residual signal, the encoding of the high-frequency subband signal and the residual signal being performed by using a second encoding method, which includes a transform domain encoding method, and the residual signal being derived from a result of encoding the low-frequency subband signal and the low-frequency subband signal,
wherein the performing the first signal reconstruction comprises:
decoding the first substream to obtain a first subband signal;
determining a first spectral coefficient of the first subband signal;
obtaining a second spectral coefficient by copying the first spectral coefficient;
obtaining a first specified quantity of first subband spectral envelopes based on the second spectral coefficient;
performing prediction based on the first spectral coefficient by using a neural network model, to obtain a first specified quantity of second subband spectral envelopes;
obtaining a second subband signal corresponding to the low-frequency subband signal and a third subband signal corresponding to the high-frequency subband signal, based on the first specified quantity of first subband spectral envelopes and the first specified quantity of second subband spectral envelopes; and
obtaining the decoded speech signal based on the second subband signal and the third subband signal.

4. The method according to claim 1, wherein the performing the second signal reconstruction comprises:
performing reconstruction based on the first substream and the at least one second substream to obtain a fourth subband signal corresponding to the low-frequency subband signal and a fifth subband signal corresponding to the high-frequency subband signal; and obtaining the decoded speech signal based on the fourth subband signal and the fifth subband signal.

5. The method according to claim 4, wherein based on the bitstream comprising at least two second substreams, the performing the reconstruction based on the first substream and the at least one second substream to obtain the fourth subband signal corresponding to the low-frequency subband signal and the fifth subband signal corresponding to the high-frequency subband signal comprises:

decoding each second substream, and obtaining, based on a result of decoding each second substream, a subband spectral envelope corresponding to the each second substream;

obtaining a seventh spectral coefficient by copying the first spectral coefficient;

adjusting the seventh spectral coefficient based on the subband spectral envelope corresponding to the each second substream, to obtain an eighth spectral coefficient; and respectively obtaining the fourth subband signal and the fifth subband signal based on the first spectral coefficient and the eighth spectral coefficient.

6. The method according to claim 4, wherein based on the bitstream comprising one second substream, the performing the reconstruction based on the first substream and the at least one second substream to obtain the fourth subband signal corresponding to the low-frequency subband signal and the fifth subband signal corresponding to the high-frequency subband signal comprises:

decoding the one second substream, and obtaining a fifth spectral coefficient based on a result of decoding the one second substream; and respectively obtaining the fourth subband signal and the fifth subband signal based on the first spectral coefficient and the fifth spectral coefficient.

7. The method according to claim 6, wherein the decoding the one second substream, and obtaining the fifth spectral coefficient based on the result of decoding the one second substream comprises:

decoding the one second substream, and obtaining a second specified quantity of third subband spectral envelopes based on a decoding result;

obtaining a sixth spectral coefficient by copying the first spectral coefficient;

obtaining the second specified quantity of fourth subband spectral envelopes based on the sixth spectral coefficient; and adjusting the sixth spectral coefficient based on the fourth subband spectral envelopes and the third subband spectral envelopes to obtain the fifth spectral coefficient.

8. The method according to claim 7, wherein the adjusting the sixth spectral coefficient based on the fourth subband spectral envelopes and the third subband spectral envelopes to obtain the fifth spectral coefficient comprises:

performing prediction based on the first spectral coefficient by using a third neural network model to obtain the second specified quantity of fifth subband spectral envelopes; and adjusting the sixth spectral coefficient based on the fourth subband spectral envelopes and the fifth subband spectral envelopes, and adjusting the sixth spectral coefficient based on the fourth subband spectral envelopes and the third subband spectral envelopes, to obtain the fifth spectral coefficient.

9. A speech signal encoding method, performed by at least one processor, the method comprising:

obtaining a low-frequency subband signal and a high-frequency subband signal of an original speech signal;

encoding the low-frequency subband signal by using a first encoding method, which includes a time domain encoding method, to obtain a first substream; and encoding the high-frequency subband signal and a residual signal by using at least one second encoding method, to obtain each second substream corresponding to each second encoding method, the at least one second encoding method including a transform domain encoding method, the residual signal being derived from a result of encoding the low-frequency subband signal and the low-frequency subband signal, wherein a bitstream comprising the first substream and at least one second substream is decoded according to the method according to claim 1.

10. The method according to claim 9, wherein during transmission of the original speech signal, a transmission priority of the first substream is higher than a transmission priority of the each second substream.

11. The method according to claim 9, wherein at least two second encoding methods are used to encode the high-frequency subband signal, and transmission priorities of second substreams respectively correspond to the at least two second encoding methods are different.

12. A speech signal decoding apparatus, comprising:

at least one memory configured to store program code; and at least one processor configured to read the program code and operate as instructed by the program code, the program code comprising:

bitstream obtaining code configured to cause the at least one processor to obtain a bitstream to be decoded, the bitstream comprising a first substream, and the first substream being a bitstream obtained by encoding a low-frequency subband signal of an original speech signal by using a first encoding method, which includes a time domain encoding method; and signal reconstruction code configured to cause the at least one processor to obtain a reconstructed speech signal by performing: (i) first signal reconstruction based on the first substream when the bitstream comprises no second substream, and (ii) second signal reconstruction based on the first substream and at least one second substream when the bitstream comprises the at least one second substream, each second substream being obtained by encoding a high-frequency subband signal of the original speech signal and a residual signal, the encoding of the high-frequency subband signal and the residual signal being performed by using a second encoding method, which includes a transform domain encoding method, and the residual signal being derived from a result of encoding the low-frequency subband signal and the low-frequency subband signal, wherein the signal reconstruction code is configured to cause the at least one processor to perform the first signal reconstruction by:

decoding the first substream to obtain a first subband signal;

determining a first spectral coefficient of the first subband signal;

performing prediction based on the first spectral coefficient by using a neural network model, to obtain a second spectral coefficient; and obtaining a decoded speech signal based on the first spectral coefficient and the second spectral coefficient.

13. The apparatus according to claim 12, wherein the signal reconstruction code is configured to cause the at least one processor to perform the first signal reconstruction by:

obtaining a second subband signal corresponding to the low-frequency subband signal and a third subband signal corresponding to the high-frequency subband signal, based on the first spectral coefficient and the second spectral coefficient; and obtaining the decoded speech signal based on the second subband signal and the third subband signal.

14. A speech signal decoding apparatus comprising:

at least one memory configured to store program code; and at least one processor configured to read the program code and operate as instructed by the program code, the program code comprising:

bitstream obtaining code configured to cause the at least one processor to obtain a bitstream to be decoded, the bitstream comprising a first substream, and the first substream being a bitstream obtained by encoding a low-frequency subband signal of an original speech signal by using a first encoding method, which includes a time domain encoding method; and signal reconstruction code configured to cause the at least one processor to obtain a reconstructed speech signal by performing: (i) first signal reconstruction based on the first substream when the bitstream comprises no second substream, and (ii) second signal reconstruction based on the first substream and at least one second substream when the bitstream comprises the at least one second substream, each second substream being obtained by encoding a high-frequency subband signal of the original speech signal and a residual signal, the encoding of the high-frequency subband signal and the residual signal being performed by using a second encoding method, which includes a transform domain encoding method, and the residual signal being derived from a result of encoding the low-frequency subband signal and the low-frequency subband signal, wherein the signal reconstruction code is configured to cause the at least one processor to perform the first signal reconstruction by:

decoding the first substream to obtain a first subband signal;

determining a first spectral coefficient of the first subband signal;

obtaining a second spectral coefficient by copying the first spectral coefficient;

obtaining a first specified quantity of first subband spectral envelopes based on the second spectral coefficient;

performing prediction based on the first spectral coefficient by using a neural network model, to obtain a first specified quantity of second subband spectral envelopes;

obtaining a second subband signal corresponding to the low-frequency subband signal and a third subband signal corresponding to the high-frequency subband signal, based on the first specified quantity of first subband spectral envelopes and the first specified quantity of second subband spectral envelopes; and obtaining the decoded speech signal based on the second subband signal and the third subband signal.

15. The apparatus according to claim 12, wherein the signal reconstruction code is configured to cause the at least one processor to perform the second signal reconstruction by:

performing reconstruction based on the first substream and the at least one second substream to obtain a fourth subband signal corresponding to the low-frequency subband signal and a fifth subband signal corresponding to the high-frequency subband signal; and obtaining the decoded speech signal based on the fourth subband signal and the fifth subband signal.

16. An electronic device, comprising a memory and a processor;

the memory storing a computer program; and the processor being configured to perform the method according to claim 1 based on execution of the computer program.

17. A non-transitory computer-readable storage medium, storing a computer program that is executable by at least one processor to perform the method according to claim 1.

18. The method according to claim 1, wherein the bitstream comprises at least two second substreams, another second substream of the at least two second substreams being obtained by encoding the high-frequency subband signal of the original speech signal by using a bandwidth expansion (BWE) encoding method.

19. A speech signal encoding method, performed by at least one processor, the method comprising:

obtaining a low-frequency subband signal and a high-frequency subband signal of an original speech signal;

encoding the low-frequency subband signal by using a first encoding method, which includes a time domain encoding method, to obtain a first substream; and encoding the high-frequency subband signal and a residual signal by using at least one second encoding method, to obtain each second substream corresponding to each second encoding method, the at least one second encoding method including a transform domain encoding method, the residual signal being derived from a result of encoding the low-frequency subband signal and the low-frequency subband signal, wherein a bitstream comprising the first substream and at least one second substream is decoded according to the method according to claim 3.

\* \* \* \* \*